United States Patent
Bugenhagen

(10) Patent No.: US 10,454,784 B2
(45) Date of Patent: *Oct. 22, 2019

(54) MODEL DRIVEN SERVICE STATE MACHINE LINKAGE METHODOLOGY AND SYSTEM

(71) Applicant: CenturyLink Intellectual Property LLC, Broomfield, CO (US)

(72) Inventor: Michael K. Bugenhagen, Leawood, KS (US)

(73) Assignee: CentryLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,467

(22) Filed: Oct. 2, 2018

(65) Prior Publication Data

US 2019/0036791 A1   Jan. 31, 2019

Related U.S. Application Data

(63) Continuation of application No. 15/392,752, filed on Dec. 28, 2016, now Pat. No. 10,110,444.
(Continued)

(51) Int. Cl.
*H04L 12/24* (2006.01)
*H04L 29/08* (2006.01)

(52) U.S. Cl.
CPC .......... *H04L 41/22* (2013.01); *H04L 41/0886* (2013.01); *H04L 41/0889* (2013.01); *H04L 41/0893* (2013.01); *H04L 41/0896* (2013.01); *H04L 41/20* (2013.01); *H04L 67/16* (2013.01); *H04L 67/36* (2013.01)

(58) Field of Classification Search
CPC ..... H04L 41/22; H04L 41/20; H04L 41/0886; H04L 41/0889; H04L 41/0893; H04L 41/0896; H04L 67/36; H04L 67/16; H04L 12/14; H04L 29/06027; H04L 41/024; H04L 63/101; H04L 7/0008;
(Continued)

(56) References Cited

U.S. PATENT DOCUMENTS 6,842,906 B1 * 1/2005 Bowman-Amuah ... G06F 9/465
718/104
10,110,444 B2   10/2018 Bugenhagen
(Continued)

*Primary Examiner* — Le H Luu

(57) ABSTRACT

Novel tools and techniques are provided for implementing model driven service state machine linkage functionality amongst different machines and/or networks. In some embodiments, a computing system of a first network associated with a first entity might establish a communication link with a node of a second network associated with a second entity. The computing system might determine whether there is a common network resource state schema between the two networks, and, if so, might identify available versions, then negotiate which version to use as common version. The computing system might retrieve network state information for the two networks, might generate a user interface that incorporates and presents the network state information for the two disparate networks consistent with the common version of the common schema, and might send the user interface to a user device of a user for display of the network state information of the two disparate networks.

20 Claims, 12 Drawing Sheets

Related U.S. Application Data

(60) Provisional application No. 62/305,634, filed on Mar. 9, 2016, provisional application No. 62/276,135, filed on Jan. 7, 2016, provisional application No. 62/275,347, filed on Jan. 6, 2016.

(58) Field of Classification Search
CPC ....... H04L 41/0853; G06F 8/20; G06F 9/465; G06Q 10/06
See application file for complete search history.

(56) References Cited

U.S. PATENT DOCUMENTS

| | | | |
|---|---|---|---|
| 2005/0198247 A1* | 9/2005 | Perry | H04L 7/0008 709/223 |
| 2005/0278708 A1* | 12/2005 | Zhao | G06F 8/20 717/136 |
| 2006/0059253 A1* | 3/2006 | Goodman | G06Q 10/10 709/223 |
| 2006/0294112 A1* | 12/2006 | Mandato | H04L 29/06027 |
| 2008/0319731 A1* | 12/2008 | Chambliss | H04L 41/024 703/22 |
| 2009/0109959 A1* | 4/2009 | Elliott | H04L 12/14 370/352 |
| 2017/0195190 A1 | 7/2017 | Bugenhagen | |
| 2018/0091516 A1* | 3/2018 | Nixon | G06Q 10/06 |

\* cited by examiner

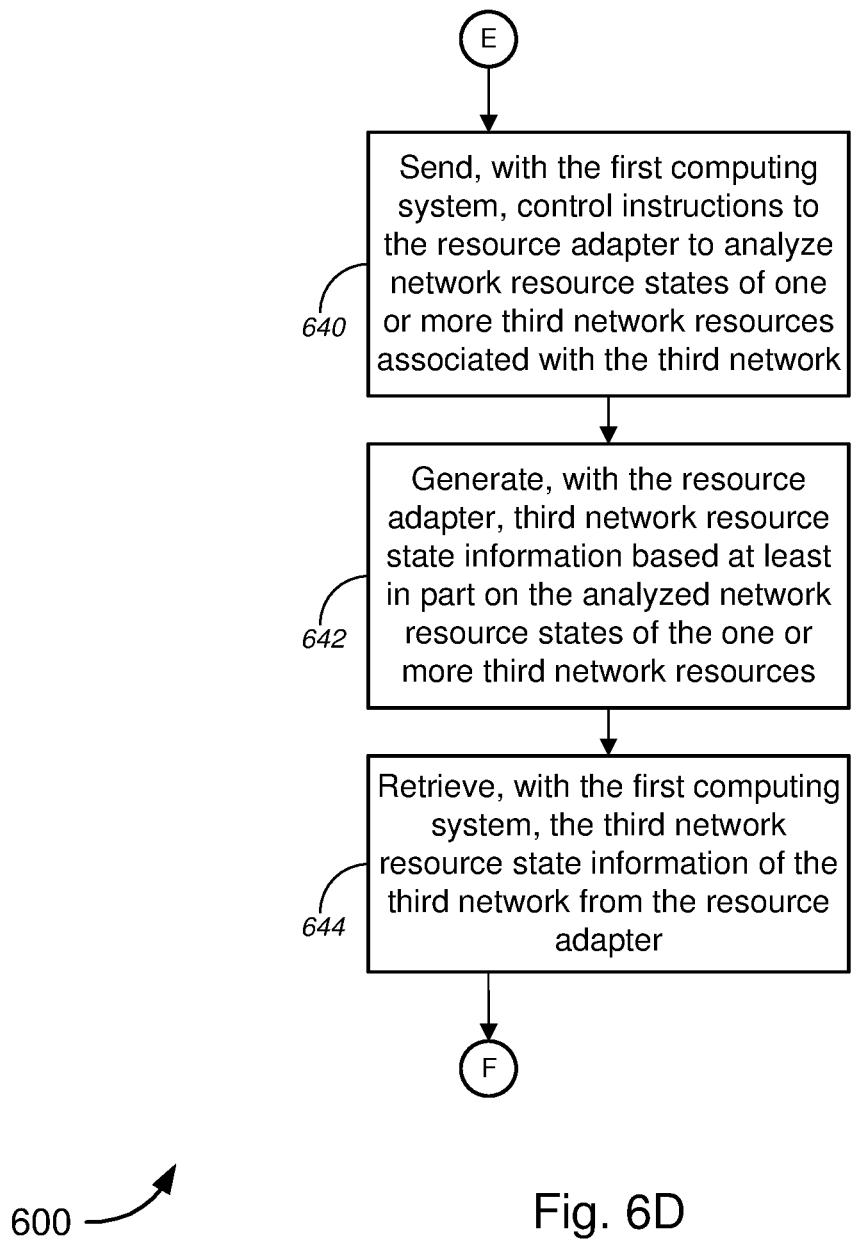

MODEL DRIVEN SERVICE STATE MACHINE LINKAGE METHODOLOGY AND SYSTEM

CROSS-REFERENCES TO RELATED APPLICATIONS

This application is a continuation of U.S. patent application Ser. No. 15/392,752 (the "'752 Application"), filed Dec. 28, 2016 by Michael K. Bugenhagen, entitled, "Model Driven Service State Machine Linkage Methodology and System," which claims priority to U.S. Patent Application Ser. No. 62/275,347 (the "'347 Application"), filed Jan. 6, 2016 by Michael K. Bugenhagen, entitled, "Algorithm Based Layered Encapsulation Schema for NFV," U.S. Patent Application Ser. No. 62/276,135 (the "'135 Application"), filed Jan. 7, 2016 by Michael K. Bugenhagen, entitled, "Algorithm Based Layered Encapsulation Schema for NFV," and U.S. Patent Application Ser. No. 62/305,634 (the "'634 Application"), filed Mar. 9, 2016 by Michael K. Bugenhagen, entitled, "Linkage Oriented Key Index for Lifecycle Service Orchestration."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing communications amongst different machines and/or networks, and, in particular embodiments, to methods, systems, apparatus, and computer software for implementing model driven service state machine linkage functionality.

BACKGROUND

Traditionally, different network service providers or cloud providers use proprietary or at least different network state schemas, equipment, etc. that make it difficult, if not impossible, for a customer who subscribes to network services of two or more of these network service providers or cloud providers to accurately and/or easily view in one user interface all the networks, network resources, nodes, etc. that the customer has subscribed to, because the different network state schemas, equipment, etc. are inconsistent with each other even with respect to particular definitions of equipment type, equipment levels, resource types, resource levels, etc. As such, the customer cannot, using a single user interface, control or otherwise change usage, parameters, settings, etc. of any of the networks, network resources, nodes, etc. that the customer has subscribed to. And, if the customer is a large company with many locations and/or many network services, it may be difficult, if not impossible, for the customer to even be aware of all the networks, network resources, nodes, etc. that the customer has subscribed to, much less aware of the states of such networks, network resources, nodes, etc.

Hence, there is a need for more robust and scalable solutions for implementing communications amongst different machines and/or networks, and, in particular embodiments, to methods, systems, apparatus, and computer software for implementing model driven service state machine linkage functionality.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 6A-6E are flow diagrams illustrating a method for implementing model driven service state machine linkage functionality, in accordance with various embodiments.

DETAILED DESCRIPTION OF CERTAIN EMBODIMENTS

Overview

Figure 1:
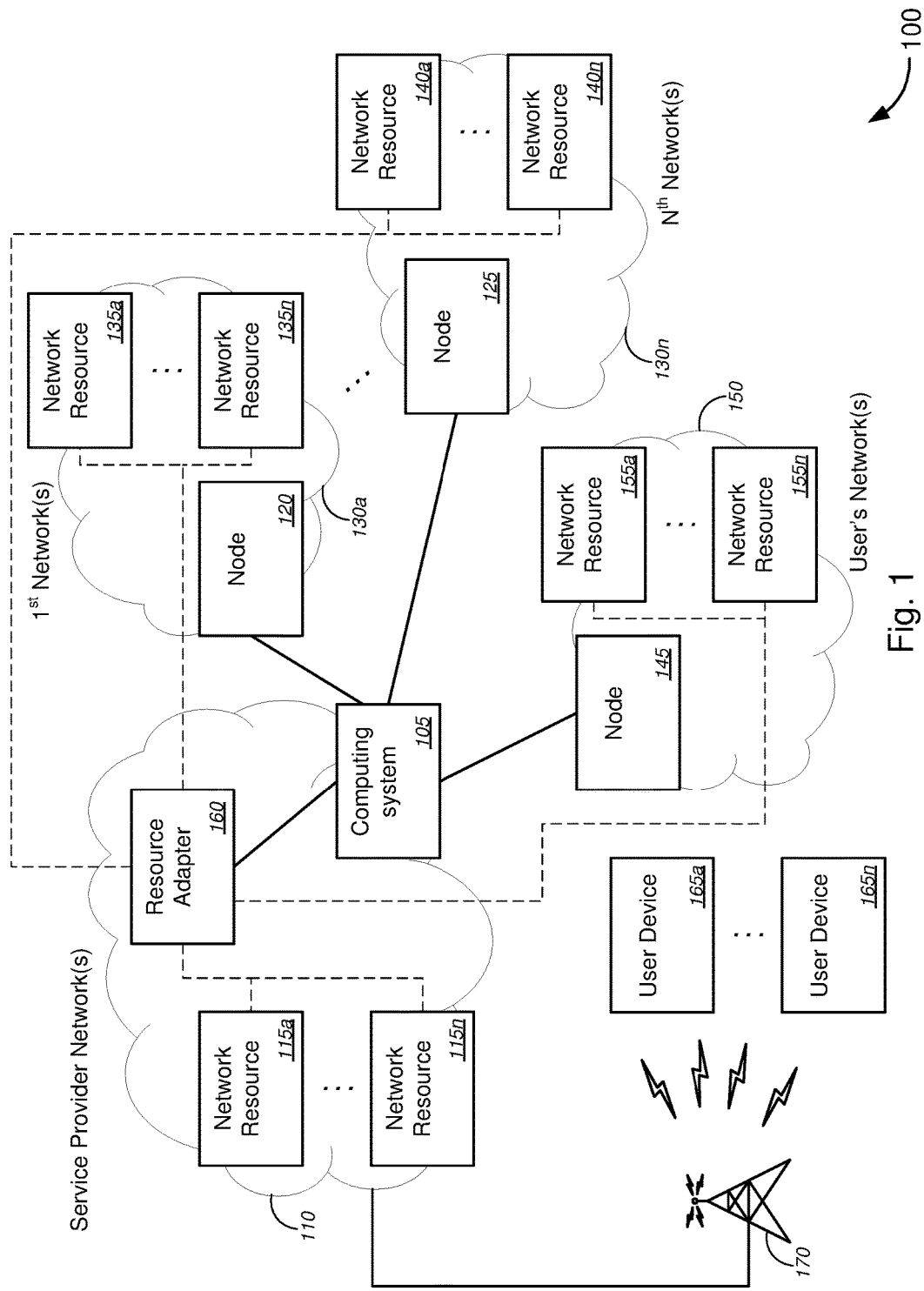
FIG. 1 is a schematic diagram illustrating a system for implementing model driven service state machine linkage functionality, in accordance with various embodiments.

Various embodiments provide tools and techniques for implementing communications amongst different machines and/or networks, and, in particular embodiments, to methods, systems, apparatus, and computer software for implementing model driven service state machine linkage functionality.

In various embodiments, a first computing system of a first network associated with a first entity might establish a communication link with a second computing system of a second network associated with a second entity. The first computing system might determine whether there is a common network resource state schema between the first and second networks. If so, the first computing system might identify which versions are available, then negotiate which version will be used to implement a common version for the communication link. If not, the first computing system might send control instructions to a resource adapter to analyze network states of one or more second network resources associated with the second network and to generate second network state information based at least in part on the analyzed network states of the one or more second network resources. The first network state information and the second network state information being consistent with the common version of the common network resource state schema. The first computing system might retrieve network state information for the two networks, might generate a user interface that incorporates and presents the network state information for the two disparate networks consistent with the common version of the common schema, and might send the user interface to a user device of a user for display of the network state information of the two networks.

According to some embodiments, the first network state information of the first network and the second network state information of the second network might include, but are not limited to, at least one of one or more attributes, one or more capabilities, or one or more states (including, without limitation, at least one of reserved, configuring, updating, off-line, up, on, active, running, and/or the like), and/or the like of each of one or more network resources of the corresponding network. In some cases, the user interface might each include, without limitation, user options for selecting and modifying at least one of preferences, settings, user-defined states, or configurations, and/or the like for each of the one or more network resources of the corresponding network. In some cases, the first computing system might receive user input associated with one or more of the at least one of preferences, settings, user-defined states, or configurations, and/or the like for each of one or more of at least one first network resource of one or more network resources of the first network or at least one second network resource of one or more network resources of the second network, and/or the like. In response to and based at least in part on the received user input, the first computing system might reconfigure each of the one or more of the at least one first network resource or the at least one second network resource, and/or the like.

In some embodiments, the first computing system might send control instructions to the resource adapter to analyze network states (or state maps) of each of the one or more of the at least one first network resource or the at least one second network resource, and/or the like, and to generate one or more of updated first network state information of the first network or updated second network state information of the second network, and/or the like, based at least in part on the analyzed network states of each of the one or more of the at least one first network resource or the at least one second network resource, and/or the like. The first computing system might retrieve the generated one or more of the updated first network state information of the first network or the updated second network state information of the second network, and/or the like. The first computing system might update the user interface with the generated one or more of the updated first network state information of the first network or updated second network state information of the second network, and/or the like, and might send the updated user interface to the user device for display on the user device. In this manner, closed loop feedback may be enabled for network control, such as for hybrid cloud control or the like. Here, hybrid cloud control might refer to control of a company's private cloud system and a service provider's (or multiple service providers') public cloud system a portion of which is used by the company. In such a hybrid cloud scenario, state transparency is required to provide the company or customer with a view of the network states of both the company's private cloud system and the service provider's (or the multiple service providers') public cloud system, which does not currently exist, but which is enabled by the various embodiments described herein. With the dynamic updating and feedback, it is also possible to implement active inventory and/or cloud catalogue across the multiple (sometimes disparate) cloud (or other network) systems, using the common network resource state schema described herein, and as implemented in the manner described herein.

According to some embodiments, a "state map" may be generated using standard state building blocks (or a "list of states" or the like) that can be exchanged. In this way, for example, when one system queries another system, the one system can be provided with information regarding what states are there, and can use the "other states" as "pass through" information as a time length value ("TLV") field (which is basically an open field that can pass anything from system to system, etc.), or the like. With this functionality, one can register "known states" and simply pass the "other state" information that the other system can provide into some comments or message in the graphical user interface ("GUI") or the like.

Further, automation may be implemented and facilitated by the methods, apparatuses, and systems described herein. At least some of these and other functions of the system 100 (and its components) are described in greater detail below with respect to FIGS. 2-6.

With the framework as described herein, the customer can, using a single user interface, control or otherwise change usage, parameters, settings, etc. of any of the networks, network resources, nodes, etc. that the customer has subscribed to. And, if the customer is a large company with many locations and/or many network services, it is now possible for the customer to be aware of all the networks, network resources, nodes, etc. that the customer has subscribed to, as well as being aware of the states (sometimes in real-time) of such networks, network resources, nodes, etc.

In a sense, the system and method described herein, according to some embodiments, might map the proprietary states of one network to the common states of a service, in another network. In some cases, this can be done by auto-mapping that vendor's state naming conventions into a common state machine using a vendor-specific state translation module (or a generic one if the specific one is missing). A "netops" type test can then be run to see if the system states are successfully mapped correctly (not unlike testing if a (universal) remote controller has actually been auto-programmed for a television, or the like).

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network virtualization technology, network configuration technology, virtualized network function technology, network integration technology, and/or the like. In other aspects, certain embodiments, can improve the functioning of user equipment or systems themselves (e.g., network integration systems, network equipment, cloud systems, etc.), for example, by determining whether there is a common network resource state schema between a first network and a second network; if so, identifying which versions of the common network resource state schema are available, and negotiating, by the first computing system with the second computing system, which version will be used to implement a first common version of the common network resource state schema between the first network and the second network; implementing, with the first computing system, the first common version of the common network resource state schema for the first communication link between the first computing system and the second computing system to harmonize network state information between the first network and the second network to generate first network state information of the first network and second network state information of the second network that are consistent with the first common version of the common network resource state schema; if not, sending control instructions to a resource adapter to analyze network states of one or more second network resources associated with the second network and to generate second network state information based at least in part on the analyzed network states of the one or more second network resources, the first network state information and the fourth network state information being consistent with the common version of the common network resource state schema; retrieving the second network state information of the second network from the second computing system; generating a user interface that incorporates and presents the first network state information of the first network and the second network state information of the second network that are consistent with the first common version of the common network resource state schema; and sending, to a user device associated with a user, the generated first user interface for display of a combination of the first network state information of the first network and the second network state information of the second network in a single user interface on the user device, and/or the like.

In particular, to the extent any abstract concepts are present in the various embodiments, those concepts can be implemented as described herein by devices, software, systems, and methods that involve specific novel functionality (e.g., steps or operations), such as determining whether there is a common network resource state schema between a first network and a second network; if so, identifying which versions of the common network resource state schema are available, and negotiating, by the first computing system with the second computing system, which version will be used to implement a first common version of the common network resource state schema between the first network and the second network; implementing, with the first computing system, the first common version of the common network resource state schema for the first communication link between the first computing system and the second computing system to harmonize network state information between the first network and the second network to generate first network state information of the first network and second network state information of the second network that are consistent with the first common version of the common network resource state schema; if not, sending control instructions to a resource adapter to analyze network states of one or more second network resources associated with the second network and to generate second network state information based at least in part on the analyzed network states of the one or more second network resources, the first network state information and the fourth network state information being consistent with the common version of the common network resource state schema; retrieving the second network state information of the second network from the second computing system; generating a user interface that incorporates and presents the first network state information of the first network and the second network state information of the second network that are consistent with the first common version of the common network resource state schema; and sending, to a user device associated with a user, the generated first user interface for display of a combination of the first network state information of the first network and the second network state information of the second network in a single user interface on the user device, and/or the like, which improves the interoperability amongst the various disparate networks that are owned and/or operated by (i.e., associated with) different multiple entities (e.g., individuals, companies, government agencies, service providers, etc.), improves the ability for a customer to view and manage the network resources across the various disparate networks associated with the different multiple entities, and/or the like, to name a few examples, that extend beyond mere conventional computer processing operations. These functionalities can produce tangible results outside of the implementing computer system, including, merely by way of example, improved interoperability amongst the various disparate networks associated with the different multiple entities, improved ability for a customer to view and manage the network resources across the various disparate networks associated with the different multiple entities, and/or the like, at least some of which may be observed or measured by customers and/or service providers.

In an aspect, a method might comprise establishing, with a first computing system of a first network that is associated with a first entity, a first communication link with a second computing system of a second network that is associated with a second entity. The method might also comprise determining, with the first computing system, whether there is a common network resource state schema between the first network and the second network; based on a determination that there is a common network resource state schema between the first network and the second network, identifying, with the first computing system, which versions of the common network resource state schema are available, and negotiating, by the first computing system with the second computing system, which version will be used to implement a first common version of the common network resource state schema between the first network and the second network; and implementing, with the first computing system, the first common version of the common network resource state schema for the first communication link between the first computing system and the second computing system to harmonize network state information between the first network and the second network to generate first network state information of the first network and second network state information of the second network that are consistent with the first common version of the common network resource state schema. The method might further comprise retrieving, with the first computing system, the second network state information of the second network from the second computing system; generating, with the first computing system, a first user interface that incorporates and presents the first network state information of the first network and the second network state information of the second network that are consistent with the first common version of the common network resource state schema; and sending, with the first computing system and to a user device associated with a user, the generated first user interface for display of a combination of the first network state information of the first network and the second network state information of the second network in a single user interface on the user device.

In some embodiments, the generated first user interface might comprise one of a web portal or a software application ("app") interface, and/or the like. In some cases, the first communication link might be a real-time interface between the first computing system of the first network and the second computing system of the second network. In some instances, the user might be one of an individual, a company, or a government agency, and/or the like. In some cases, the first entity might be a first network service provider that provides network services to the user, while the second entity might be one of a second service provider separate from the first network service provider, an entity associated with the user, or a second company that is separate from any of the first network service provider and the user, and/or the like.

According to some embodiments, the first network state information might comprise at least one of one or more first attributes, one or more first capabilities, or one or more first states, and/or the like of each of one or more first network resources of the first network, while the second network state information comprises at least one of one or more second attributes, one or more second capabilities, or one or more second states, and/or the like of each of one or more second network resources of the second network. The generated first user interface might comprise user options for selecting and modifying at least one of preferences, settings, user-defined states, or configurations, and/or the like for each of the one or more first network resources of the first network and for each of the one or more second network resources of the second network.

In some instances, the method might further comprise receiving, with the first computing system, user input associated with one or more of the at least one of preferences, settings, user-defined states, or configurations for each of one or more of at least one first network resource of the one or more first network resources of the first network or at least one second network resource of the one or more second network resources of the second network; and in response to and based at least in part on the received user input, reconfiguring, with the first computing system, each of the one or more of the at least one first network resource or the at least one second network resource. The method might also comprise sending, with the first computing system, control instructions to a resource adapter to analyze network states of each of the one or more of the at least one first network resource or the at least one second network resource, and to generate one or more of updated first network state information of the first network or updated second network state information of the second network based at least in part on the analyzed network states of each of the one or more of the at least one first network resource or the at least one second network resource. The method might further comprise retrieving, with the first computing system, the generated one or more of the updated first network state information of the first network or the updated second network state information of the second network from the resource adapter; updating, with the first computing system, the first user interface with the generated one or more of the updated first network state information of the first network or the updated second network state information of the second network; and sending, with the first computing system and to the user device associated with the user, the updated first user interface for display on the user device.

Alternatively, or additionally, the method might further comprise establishing, with the first computing system, a second communication link with a third computing system of a third network that is associated with a third entity; determining, with the first computing system, whether there is a common network resource state schema between the first network and the third network; and based on a determination that there is a common network resource state schema between the first network and the third network, identifying, with the first computing system, which versions of the common network resource state schema are available, and negotiating, by the first computing system with the third computing system, which version will be used to implement a second common version of the common network resource state schema between the first network and the third network. The method might also comprise implementing, with the first computing system, the second common version of the common network resource state schema for the first communication link between the first computing system and the third computing system to harmonize network state information between the first network and the third network to generate first network state information of the first network and third network state information of the third network that are consistent with the second common version of the common network resource state schema; and retrieving, with the first computing system, the third network state information of the third network from the third computing system. The method might further comprise generating, with the first computing system, a second user interface that incorporates and presents the first network state information of the first network and the third network state information of the third network that are consistent with the second common version of the common network resource state schema; and sending, with the first computing system and to the user device associated with the user, the generated second user interface for display of a combination of the first network state information of the first network and the third network state information of the third network in a single user interface on the user device.

In some cases, the first entity might be a first network service provider that provides network services to the user, while the second entity might be one of a second service provider separate from the first network service provider, an entity associated with the user, or a second company that is separate from both the first network service provider and the user, and/or the like, and the third entity might be one of a third service provider separate from the first network service provider, an entity associated with the user, or a third company that is separate from any of the first network service provider and the user, and/or the like.

In some embodiments, the first common version of the common network resource state schema and the second common version of the common network resource state schema might be the same common version of the common network resource state schema. In such cases, generating the second user interface might comprise generating, with the first computing system, the second user interface that incorporates and presents the first network state information of the first network, the second network state information of the second network, and the third network state information of the third network that are consistent with the second common version of the common network resource state schema. Sending the generated second user interface might comprise sending, with the first computing system and to the user device associated with the user, the generated second user interface for display of a combination of the first network state information of the first network, the second network state information of the second network, and the third network state information of the third network in a single user interface on the user device.

Alternatively, or additionally, the method might further comprise establishing, with the first computing system, a third communication link with a fourth computing system of a fourth network that is associated with a fourth entity; determining, with the first computing system, whether there is a common network resource state schema between the first network and the fourth network; and, based on a determination that there is no common network resource state schema between the first network and the fourth network, sending, with the first computing system, control instructions to a resource adapter to analyze network states of one or more fourth network resources associated with the fourth network and to generate fourth network state information based at least in part on the analyzed network states of the one or more fourth network resources, the first network state information and the fourth network state information being consistent with a third common version of the common network resource state schema. The method might further comprise retrieving, with the first computing system, the fourth network state information of the fourth network from the resource adapter; generating, with the first computing system, a third user interface that incorporates and presents the first network state information of the first network and the fourth network state information of the fourth network that are consistent with the third common version of the common network resource state schema; and sending, with the first computing system and to the user device associated with the user, the generated third user interface for display of a combination of the first network state information of the first network and the fourth network state information of the fourth network in a single user interface on the user device.

According to some embodiments, the fourth network might utilize a legacy network state schema that is different from the common network resource state schema. In some embodiments, the first common version of the common network resource state schema and the third common version of the common network resource state schema might be the same common version of the common network resource state schema. In such a case, generating the third user interface might comprise generating, with the first computing system, the third user interface that incorporates and presents the first network state information of the first network, the second network state information of the second network, and the fourth network state information of the fourth network that are consistent with the third common version of the common network resource state schema. Sending the generated second user interface might comprise sending, with the first computing system and to the user device associated with the user, the generated third user interface for display of a combination of the first network state information of the first network, the second network state information of the second network, and the fourth network state information of the fourth network in a single user interface on the user device.

In another aspect, an apparatus of a first network that is associated with a first entity might be provided. The apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: establish a first communication link with a second computing system of a second network that is associated with a second entity; determine whether there is a common network resource state schema between the first network and the second network; based on a determination that there is a common network resource state schema between the first network and the second network, identify which versions of the common network resource state schema are available, and negotiating, by the first computing system with the second computing system, which version will be used to implement a first common version of the common network resource state schema between the first network and the second network; implement the first common version of the common network resource state schema for the first communication link between the apparatus and the second computing system to harmonize network state information between the first network and the second network to generate first network state information of the first network and second network state information of the second network that are consistent with the first common version of the common network resource state schema; retrieve the second network state information of the second network from the second computing system; generate a first user interface that incorporates and presents the first network state information of the first network and the second network state information of the second network that are consistent with the first common version of the common network resource state schema; and send, to a user device associated with a user, the generated first user interface for display of a combination of the first network state information of the first network and the second network state information of the second network in a single user interface on the user device.

In some embodiments, the first network state information might comprise at least one of one or more first attributes, one or more first capabilities, or one or more first states, and/or the like of each of one or more first network resources of the first network, while the second network state information might comprise at least one of one or more second attributes, one or more second capabilities, or one or more second states, and/or the like of each of one or more second network resources of the second network. In some cases, the generated first user interface might comprise user options for selecting and modifying at least one of preferences, settings, user-defined states, or configurations, and/or the like for each of the one or more first network resources of the first network and for each of the one or more second network resources of the second network.

According to some embodiments, the set of instructions, when executed by the at least one processor, further causes the apparatus to: receive user input associated with one or more of the at least one of preferences, settings, user-defined states, or configurations for each of one or more of at least one first network resource of the one or more first network resources of the first network or at least one second network resource of the one or more second network resources of the second network; in response to and based at least in part on the received user input, reconfigure each of the one or more of the at least one first network resource or the at least one second network resource; send control instructions to a resource adapter to analyze network states of each of the one or more of the at least one first network resource or the at least one second network resource, and to generate one or more of updated first network state information of the first network or updated second network state information of the second network based at least in part on the analyzed network states of each of the one or more of the at least one first network resource or the at least one second network resource; retrieve the generated one or more of the updated first network state information of the first network or the updated second network state information of the second network from the resource adapter; update the first user interface with the generated one or more of the updated first network state information of the first network or the updated second network state information of the second network; and send, to the user device associated with the user, the updated first user interface for display on the user device.

Alternatively, or additionally, the set of instructions, when executed by the at least one processor, further causes the apparatus to: establish a second communication link with a third computing system of a third network that is associated with a third entity; determine whether there is a common network resource state schema between the first network and the third network; based on a determination that there is a common network resource state schema between the first network and the third network, identify which versions of the common network resource state schema are available, and negotiating, by the first computing system with the third computing system, which version will be used to implement a second common version of the common network resource state schema between the first network and the third network; implement the second common version of the common network resource state schema for the first communication link between the first computing system and the third computing system to harmonize network state information between the first network and the third network to generate first network state information of the first network and third network state information of the third network that are consistent with the second common version of the common network resource state schema; retrieve the third network state information of the third network from the third computing system; generate a second user interface that incorporates and presents the first network state information of the first network and the third network state information of the third network that are consistent with the second common version of the common network resource state schema; and send, to the user device associated with the user, the generated second user interface for display of a combination of the first network state information of the first network and the third network state information of the third network in a single user interface on the user device.

Alternatively, or additionally, the set of instructions, when executed by the at least one processor, further causes the apparatus to: establish a third communication link with a fourth computing system of a fourth network that is associated with a fourth entity; determine whether there is a common network resource state schema between the first network and the fourth network; based on a determination that there is no common network resource state schema between the first network and the fourth network, send control instructions to a resource adapter to analyze network states of one or more fourth network resources associated with the fourth network and to generate fourth network state information based at least in part on the analyzed network states of the one or more fourth network resources, the first network state information and the fourth network state information being consistent with a third common version of the common network resource state schema; retrieve the fourth network state information of the fourth network from the resource adapter; generate a third user interface that incorporates and presents the first network state information of the first network and the fourth network state information of the fourth network that are consistent with the third common version of the common network resource state schema; and send, to the user device associated with the user, the generated third user interface for display of a combination of the first network state information of the first network and the fourth network state information of the fourth network in a single user interface on the user device.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for implementing communications amongst different machines and/or networks, and, in particular embodiments, to methods, systems, apparatus, and computer software for implementing model driven service state machine linkage functionality, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing model driven service state machine linkage functionality, in accordance with various embodiments.

In the non-limiting embodiment of FIG. 1, system 100 might comprise a computing system 105, a service provider network(s) 110, and one or more network resources 115a-115n (collectively, "network resources 115" or the like; which might include, without limitation, compute resources, data storage resources, analytics resources, application resources, network resources, and/or the like). The computing system 105 and the network resources 115 might be disposed or located within network 110. System 100 might further comprise a node 120, a node 125, first through $N^{th}$ networks 130a-130n (collectively, "networks 130" or the like), one or more network resources 135a-135n (collectively, "network resources 135" or the like; which might include, but are not limited to, compute resources, data storage resources, analytics resources, application resources, network resources, and/or the like), and one or more network resources 140a-140n (collectively, "network resources 140" or the like; which might include, without limitation, compute resources, data storage resources, analytics resources, application resources, network resources, and/or the like). The node 120 and the network resources 135 might be disposed or located within the first network 130a, while the node 125 and the network resources 140 might be disposed or located within the $N^{th}$ network 130n, and so on, with similar nodes and network resources being disposed or located within intermediate networks (i.e., the second through the $(N-1)^{th}$ networks, or the like).

In some embodiments, system 100 might further comprise a node 145, user's network(s) 150 associated with a user, and one or more network resources 155a-155n (collectively, "network resources 155" or the like; which might include, but are not limited to, compute resources, data storage resources, analytics resources, application resources, network resources, and/or the like). The node 145 and the network resources 155 might be disposed or located within the user's network(s) 150. System 100, in some cases, might also comprise resource adapter 160, one or more user devices 165a-165n (collectively, "user devices 165," "devices 165," or the like), which might be associated with the user. In some instances, the user might be one of an individual, a company, or a government agency, and/or the like. System 100 might further comprise one or more telecommunications relay systems 170 that might communicatively couple (via wireless and/or wired connection(s)) each of at least one of the user devices 165 with network 110 (and in some cases, with computing system 105, with at least one of the network resources 115, with one or more of the networks 130a-130n and/or 150, with the nodes or network resources in the one or more of the networks 130a-130n and/or 150, and/or the like). The one or more telecommunications relay systems 170 might include, without limitation, one or more wireless network interfaces (e.g., wireless modems, wireless access points, and the like), one or more towers, one or more satellites, and/or the like.

In some embodiments, resource adapter 160 might communicatively couple, as needed or when requested or instructed, to each of one or more of the network resources 115 in network 110, one or more of the network resources 135 in network 130a, one or more of the network resources 140 in network 130n, one or more of the network resources 155 in network 150, and/or the like (as depicted by the dashed lines in FIG. 1. In other words, the resource adapter 160 might access (in some cases, via the data link layer or the like) one or more of the first through $N^{th}$ networks 130a-130n (as depicted in FIG. 1 by dashed lines connecting the resource adapter 160 to each of network resources 135a-135n and 140a-140n via service provider network(s) 110) in order to analyze network states of each of one or more of at least one network resource 135 of the first network 130a through at least one network resource 140 of the $N^{th}$ network 130n, and to generate one or more of updated first network state information of the first network 130a through updated $N^{th}$ network state information of the $N^{th}$ network 130n, based at least in part on the analyzed network states of each of the one or more of the at least one network resource 135 through the at least one network resource 140. Similarly, the resource adapter 160 might access user's network(s) 150 (as depicted in FIG. 1 by dashed lines connecting the resource adapter 160 to each of network resources 155a-155n via service provider network(s) 110) in order to analyze network states of each of at least one network resource 155 of the user's network(s) 150, and to generate one or more of updated network state information of the user's network(s) 150, based at least in part on the analyzed network states of each of the at least one network resource 155. In like manner, the resource adapter 160 might access network resources 115a-115n (as depicted in FIG. 1 by dashed lines connecting the resource adapter 160 to each of network resources 115a-115n within service provider network(s) 110) in order to analyze network states of each of at least one network resource 115 of the service provider network(s) 110, and to generate one or more of updated network state information of the service provider network(s) 110, based at least in part on the analyzed network states of each of the at least one network resource 115.

In operation, the computing system 105 of network 110 (which might be associated with a service provider associated with providing network services to the user) might establish a first communication link with each of at least one of node 120 of network 130a (which might be associated with a first other entity) through node 125 of network 130n (which might be associated with an $N^{th}$ other entity), or node 145 of user's network 150 (which is associated with the user), and/or the like. The computing system 105 might determine whether there is a common network resource state schema between the network 110 and each of corresponding at least one of the network 130a through the network 130n or the network 150, and/or the like. If so, the computing system 105 might identify which versions of the common network resource state schema are available, and negotiating, by the computing system 105 with each of the at least one of node 120 through node 125, or node 145, and/or the like, which version will be used to implement a first common version of the common network resource state schema between the network 110 and each of the corresponding at least one of the network 130a through the network 130n or the network 150, and/or the like.

The computing system 105 might implement the first common version of the common network resource state schema for the first communication link between the computing system 105 and each of at least one of the node 120 through the node 125 or the node 145, and/or the like, to harmonize network state information between the first network and each of the corresponding at least one of the network 130a through the network 130n or the network 150, and/or the like, to generate first network state information of the network 110 and network state information of each of the corresponding at least one of the network 130a through the network 130n or the network 150, and/or the like that are consistent with the first common version of the common network resource state schema. The computing system 105 might retrieve the network state information of the each of the corresponding at least one of the network 130a through the network 130n or the network 150, and/or the like from each of the at least one of the node 120 through the node 125 or the node 145, and/or the like.

Based on a determination that there is no common network resource state schema between the network 110 and at least one of the network 130a through the network 130n or the network 150, and/or the like (perhaps due to the at least one of the network 130a through the network 130n or the network 150, and/or the like utilizing legacy equipment and network state schemas, or the like), the computing system 105 might send control instructions to resource adapter 160 to analyze network states of one or more network resources associated with the at least one of the network 130a through the network 130n or the network 150, and/or the like, and to generate network state information based at least in part on the analyzed network states of the at least one of the network 130a through the network 130n or the network 150, and/or the like, the first network state information and the network state information of the at least one of the network 130a through the network 130n or the network 150, and/or the like being consistent with a second common version of the common network resource state schema. In some cases, the second common version might be the same as the first common version of the common network resource state schema. The first computing system might retrieve the network state information of the at least one of the network 130a through the network 130n or the network 150, and/or the like from the resource adapter 160.

The computing system 105 might generate a first user interface that incorporates and presents the first network state information of the network 110 and the network state information of each of the corresponding at least one of the network 130a through the network 130n or the network 150, and/or the like that are consistent with the first (or second) common version of the common network resource state schema. The computing system 105 might send, to a user device(s) 165 associated with the user, the generated first user interface for display of a combination of the first network state information of the network 110 and the network state information of each of the corresponding at least one of the network 130a through the network 130n or the network 150, and/or the like, in a single user interface on the user device(s) 165.

According to some embodiments, each of the first network state information of network 110 and the network state information of each of the corresponding at least one of the network 130a through the network 130n or the network 150, and/or the like might include, but are not limited to, at least one of one or more attributes, one or more capabilities, or one or more states, and/or the like of each of one or more network resources of the corresponding network. In some cases, the generated first user interface might each include, without limitation, user options for selecting and modifying at least one of preferences, settings, user-defined states, or configurations, and/or the like for each of the one or more network resources of the corresponding network. In some cases, the computing system 105 might receive user input associated with one or more of the at least one of preferences, settings, user-defined states, or configurations, and/or the like for each of one or more of at least one first network resource of the one or more network resources 115a-115n of the network 110, at least one second network resource of the one or more network resources 135a-135n of the network 130a, at least one third network resource of the one or more network resources 140a-140n of the network 130n, or at least one fourth network resource of the one or more network resources 155a-155n of the network 150, and/or the like. In response to and based at least in part on the received user input, the computing system 105 might reconfigure each of the one or more of the at least one first network resource, the at least one second network resource, the at least one third network resource, or the at least one fourth network resource, and/or the like.

In some embodiments, the computing system 105 might send control instructions to the resource adapter 160 to analyze network states (or state maps) of each of the one or more of the at least one first network resource, the at least one second network resource, the at least one third network resource, or the at least one fourth network resource, and/or the like, and to generate one or more of updated first network state information of the network 110 or updated network state information of each of the corresponding at least one of the network 130a through the network 130n or the network 150, and/or the like, based at least in part on the analyzed network states of each of the one or more of the at least one first network resource, the at least one second network resource, the at least one third network resource, or the at least one fourth network resource, and/or the like. The computing system 105 might retrieve the generated one or more of the updated first network state information of the network 110 or updated network state information of each of the corresponding at least one of the network 130a through the network 130n or the network 150, and/or the like. The computing system 105 might update the first user interface with the generated one or more of the updated first network state information of the network 110 or updated network state information of each of the corresponding at least one of the network 130a through the network 130n or the network 150, and/or the like, and might send the updated first user interface to the user device(s) 165 for display on the user device(s) 165. In this manner, closed loop feedback may be enabled for network control, such as for hybrid cloud control or the like. Here, hybrid cloud control might refer to control of a company's private cloud system and a service provider's (or multiple service providers') public cloud system a portion of which is used by the company. In such a hybrid cloud scenario, state transparency is required to provide the company or customer with a view of the network states of both the company's private cloud system and the service provider's (or the multiple service providers') public cloud system, which does not currently exist, but which is enabled by the various embodiments described herein. With the dynamic updating and feedback, it is also possible to implement active inventory and/or cloud catalogue across the multiple (sometimes disparate) cloud (or other network) systems, using the common network resource state schema described herein, and as implemented in the manner described herein.

According to some embodiments, a "state map" may be generated using standard state building blocks (or a "list of states" or the like) that can be exchanged. In this way, for example, when one system queries another system, the one system can be provided with information regarding what states are there, and can use the "other states" as "pass through" information as a time length value ("TLV") field (which is basically an open field that can pass anything from system to system, etc.), or the like. With this functionality, one can register "known states" and simply pass the "other state" information that the other system can provide into some comments or message in the graphical user interface ("GUI") or the like.

Further, automation may be implemented and facilitated by the methods, apparatuses, and systems described herein. These and other functions of the system 100 (and its components) are described in greater detail below with respect to FIGS. 2-6.

Figure 2:
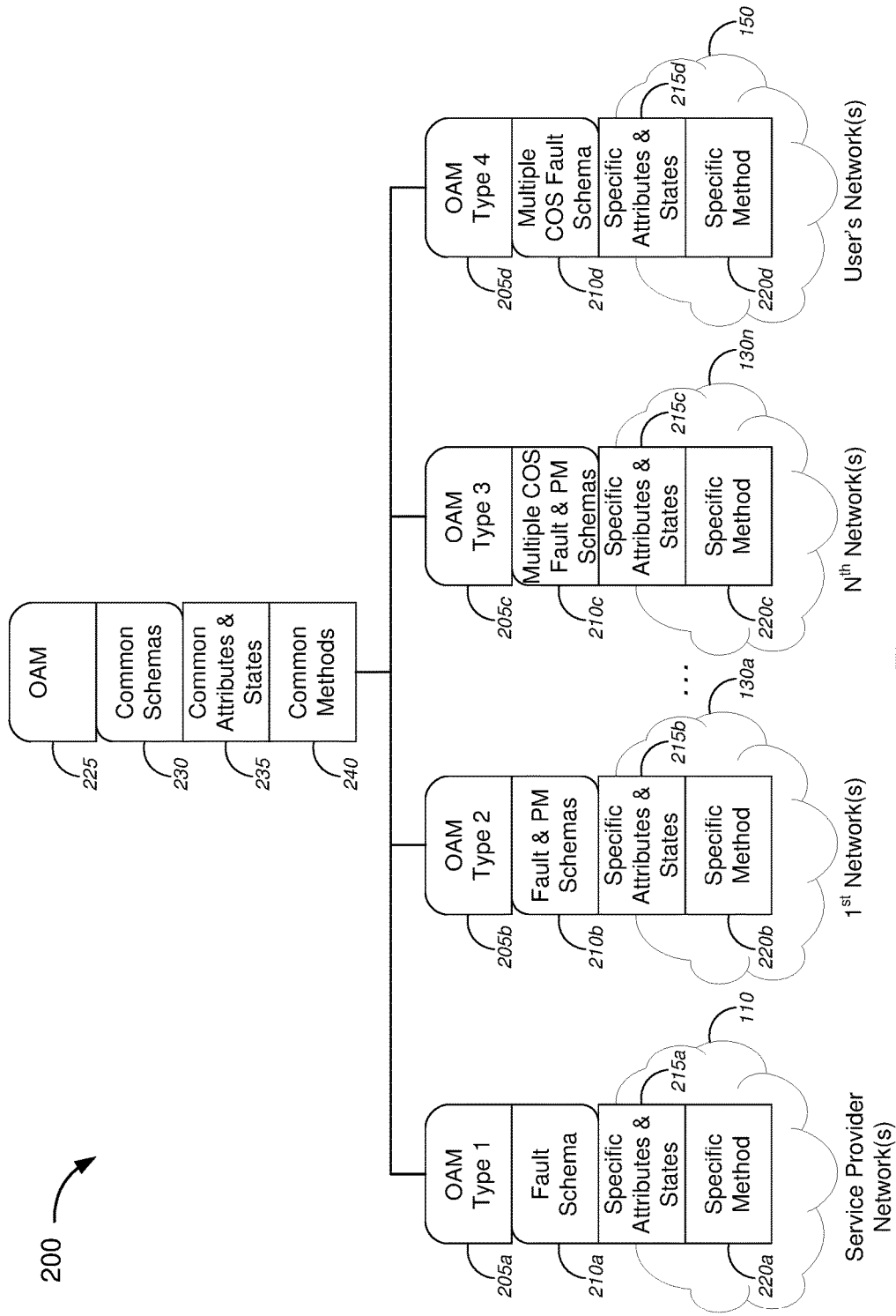
FIG. 2 is a schematic diagram illustrating an exemplary embodiment depicting use of super classes to implement model driven service state machine linkage functionality.

FIG. 2 is a schematic diagram illustrating an exemplary embodiment 200 depicting use of super classes to implement model driven service state machine linkage functionality. In the non-limiting embodiment 200 of FIG. 2, each of the networks 110, 130a-130n, and 150 of system 100 of FIG. 1 might each have a private schema or the like for each network layer. For instance, the service provider network(s) 110 might use a first type of operations, administration, and management/maintenance ("OAM"; which might be a fault-only type of OAM) for its operations support system ("OSS") layer 205a, might use a fault schema in its service layer 210a, might use specific attributes and states for its controller layer 215a, and might use specific methods for its network node layer 220a. Similarly, the network 130a might use a second type of OAM for its OSS layer 205b, might use a fault schema (which might, in some cases, be different from that of service layer 210a) and a product media ("PM") schema in its service layer 210b, might use specific attributes and states for its controller layer 215b (which might, in some instances, be different from those of controller layer 215a), and might use specific methods for its network node layer 220b (which might, in some cases, be different from those of network node layer 220a). Likewise, the network 130n might use a third type of OAM for its OSS layer 205c, might use a multiple class of service ("COS") fault schema (which might, in some cases, be different from that of service layers 210a and 210b) and multiple COS product media ("PM") schema in its service layer 210c, might use specific attributes and states for its controller layer 215c (which might, in some instances, be different from those of controller layers 215a and 215b), and might use specific methods for its network node layer 220c (which might, in some cases, be different from those of network node layers 220a and 220b). In a similar manner, the user's network 150 might use a fourth type of OAM for its OSS layer 205d, might use a multiple COS fault schema (which might, in some cases, be different from that of service layer 210c) in its service layer 210d, might use specific attributes and states for its controller layer 215d (which might, in some instances, be different from those of controller layers 215a-215c), and might use specific methods for its network node layer 220d (which might, in some cases, be different from those of network node layers 220a-220c).

According to some embodiments, a super class may be created (albeit not based on particular technology (i.e., the super class should be technology agnostic) and without changing the system software (which might be labor and cost intensive to implement such changes). Rather, super classes might be built from common "service attributes" across all technologies in the network. In some cases, all the super classes might be based on top-down service requirements that are "common" to all the sub-class members.

In accordance with the various embodiments, a super class may be created for each class of service or for each network layer. For example, OAM in OSS layer 225 might be a super class for the OSS layers 205a-205d, and might reflect an OAM that is common to all of the first type of OAM in OSS layer 205a, the second type of OAM in OSS layer 205b, the third type of OAM in OSS layer 205c, and the fourth type of OAM in OSS layer 205d. Similarly, the common schemas in service layer 230 might be a super class for the service layers 210a-210d, and might reflect a schema that is common to all of the fault schema in service layer 210a, the fault schema and PM schema in service layer 210b, the multiple COS fault schema and multiple COS PM schema in service layer 210c, and the multiple COS fault schema in service layer 210d. Likewise, the common attributes and states in controller layer 235 might be a super class for the controller layers 215a-215d, and might reflect attributes and states that are common to all of the attributes and states used in controller layer 215a, the attributes and states used in controller layer 215b, the attributes and states used in controller layer 215c, and the attributes and states used in controller layer 215d. In a similar manner, the common methods used in network node layer 240 might be a super class for the network node layers 220a-220d, and might reflect methods that are common to all of the methods used in network node layer 220a, the methods used in network node layer 220b, the methods used in network node layer 220c, and the methods used in network node layer 220d.

In some embodiments, as shown in FIG. 2, the schemas may cross multiple layers (such as global reference objects). In some cases, these global or common schemas might have attributes that are algorithm-based. According to some embodiments, such global or common schemas might tie two layers together. For example, the global schemas might tie two service layers together (e.g., QoS for VoIP, QoS for Video, etc.). In another example, the global schemas might tie a service requirement to a node capability, or the like. And so on.

Figure 3:
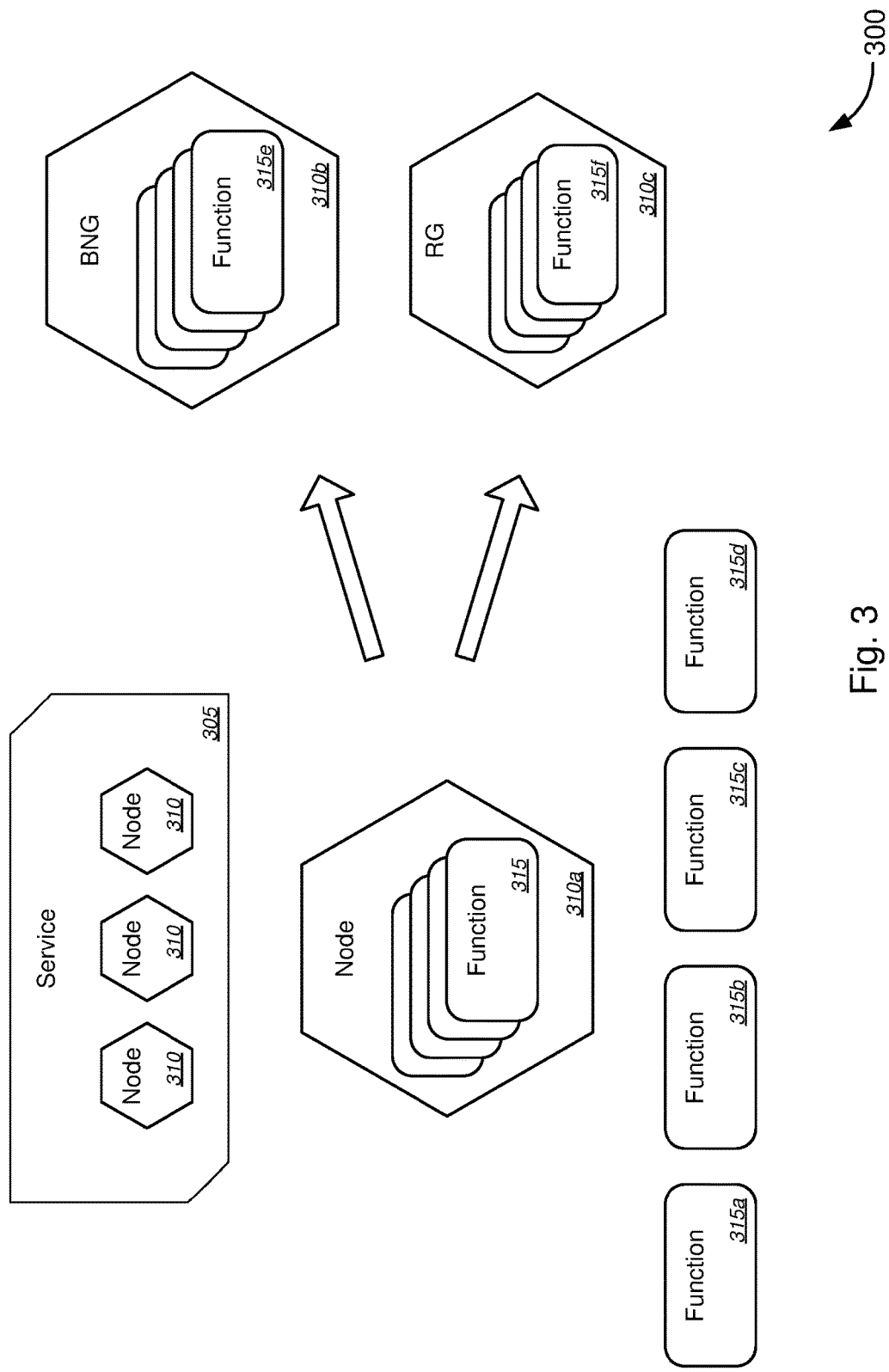
FIG. 3 is a schematic diagram illustrating an exemplary embodiment of algorithm-based global objects that may be used to implement model driven service state machine linkage functionality.

FIG. 3 is a schematic diagram illustrating an exemplary embodiment 300 of algorithm-based global objects that may be used to implement model driven service state machine linkage functionality. In the non-limiting embodiment 300 of FIG. 3, a service template 305 might include one or more nodes 310. Services may be templates or templates, and may be analogous to "service architecture design patterns." Each node 310 (for example, node 310a) might comprise one or more functions 315 (such as functions 315a-315d or the like), which might be any suitable network function or the like. Nodes might be specific configurations of functions (e.g., "equipment design pattern" or the like). Design patterns might provide the flexibility to meet the variation in service provider offerings and in vendor element/node functionality (e.g., in the composure variation approach, or the like).

Algorithm-based liked encapsulation creates an executable framework. Layer linkage might be accomplished by schema or schema objects (which might be commonly used abstracts or the like). In some cases, these might the "knobs" that a service provider might want the customer to turn in his or her portal or other user interface. In some embodiments, they might be controlled global objects used by the framework from the top to the bottom to ensure alignment and, in some cases, automation. Examples of such global objects might include, without limitation, service qualitative measures (e.g., in megabytes or the like), quality of service ("QoS"), addressing, location, and/or the like. Because they are algorithm-based, they can be automated. Automation, however, requires cardinality (i.e., uniqueness) at all layers. As for the global or common schemas, how encapsulation is performed also enables a flexible framework that can be expanded, provided one stays away from specific technology abstractions, and stays with functional abstractions.

In some cases, the node 310*a* might be a broadband network gateway ("BNG") 310*b* comprising one or more functions 315*e*. Alternatively, the node 310*a* might be a residential gateway 310*c* comprising one or more functions 315*f*.

Figure 4:
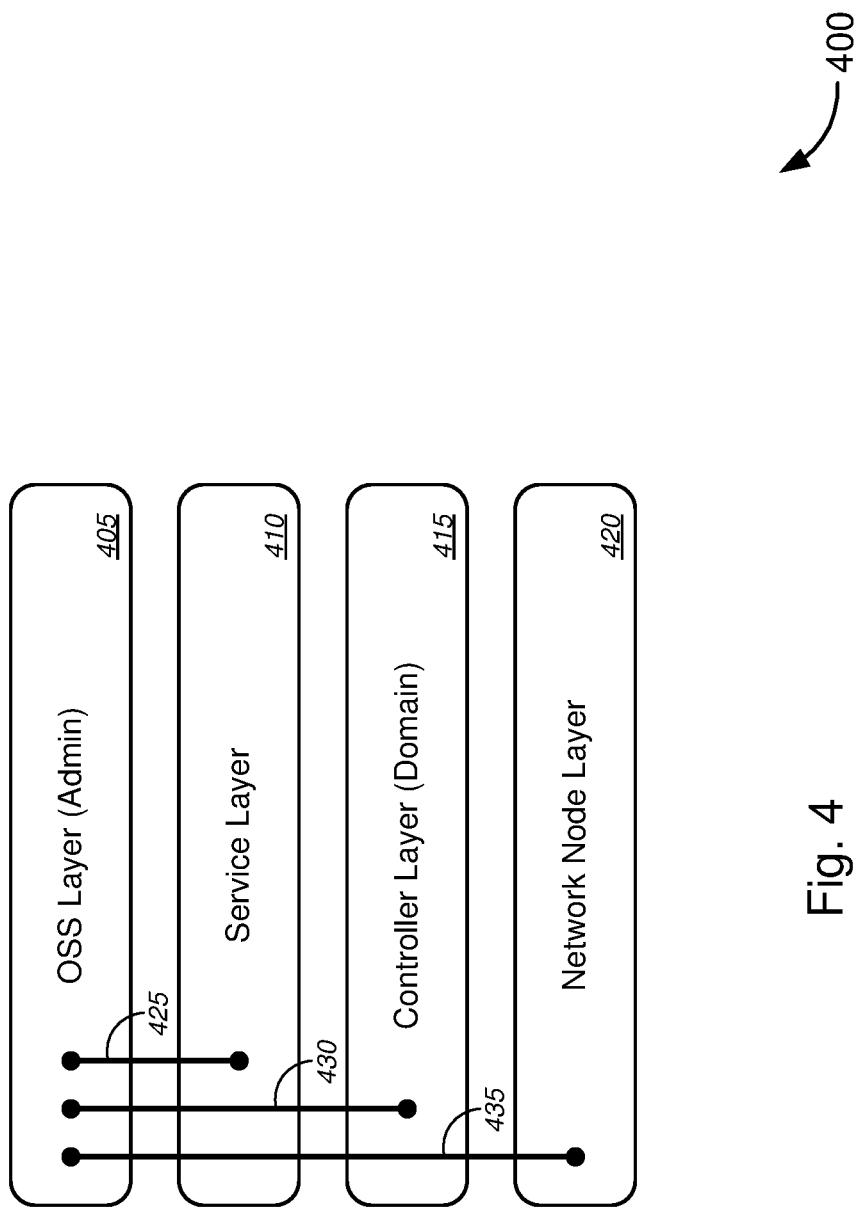
FIG. 4 is a schematic diagram illustrating an exemplary embodiment of linkages amongst different network layers of a network that may be used to implement model driven service state machine linkage functionality.

FIG. 4 is a schematic diagram illustrating an exemplary embodiment 400 of linkages amongst different network layers of a network that may be used to implement model driven service state machine linkage functionality. In the non-limiting embodiment 400 of FIG. 4, linkages may be implemented or established amongst two or more of the network layers, which might include, but are not limited to, OSS layer 405 (which might also be referred to as "Admin" or "Admin layer"), service layer 410, controller layer 415 (which might also be referred to as "Domain" or "Domain layer"), and a network node layer 420. For example, a first link or linkage might be implemented or established between the OSS layer 405 and the service layer 410, while a second link or linkage might be implemented or established between the OSS layer 405 and the controller layer 415, and a third link or linkage might be implemented or established between the OSS layer 405 and the network node layer 420, and/or the like.

In some embodiments, links or linkages might be global class objects, including, but not limited to, time, date, location, etc, with schemas to those matching linkages. In some cases, the network layer 420 might comprise essentially of nodes (such as nodes 310 or 310*a*-310*c* of FIG. 3) made up of designs (that might be cardinalized by the service data objects ("SDOs") or the like), using standard functional constructs that map back up to the service requirements layer via the linkages. In some instances, the domain level or service controller layer 415 might add some new objects, such as those that should be linked or related to the service layer 410, or the like. In the service layer 410, according to some embodiments, a service template (such as service template 305 of FIG. 3 or the like) might contain all the service requirements of the features pre-linked to the network capabilities. Merely by way of example, in some aspects, these features might enable a method in which, a trading partner (for example) might group each feature that is coded as being private, and how such private features are exposed to a customer is how it is productized—that is, one of mandatory (i.e., must specify), restricted (i.e., not negotiable), conditional (i.e., must purchase x to get y, etc.), or optional (i.e., as an add-on, etc.), and the like.

What happens in the OSS layer 405 depends on what a provider does in one or more of the service layer 410, the controller layer 415, and/or the network node layer 420. Ideally, one would alter a mediation layer to reflect network functions virtualization ("NFV") service requirement abstractions and might have legacy platforms modify their element management systems ("EMS") and/or their network management systems ("NMS") accordingly, which might streamline the process of backwards compatibility and hybrid management orchestration, or the like. However, mediation layers require manual changes with non-aligned piece parts. The various embodiments herein provide for methods and systems (e.g., a framework) that can enable automation of the processes for linking the various layers as well as linking with other networks associated with multiple other services providers.

Figure 5:
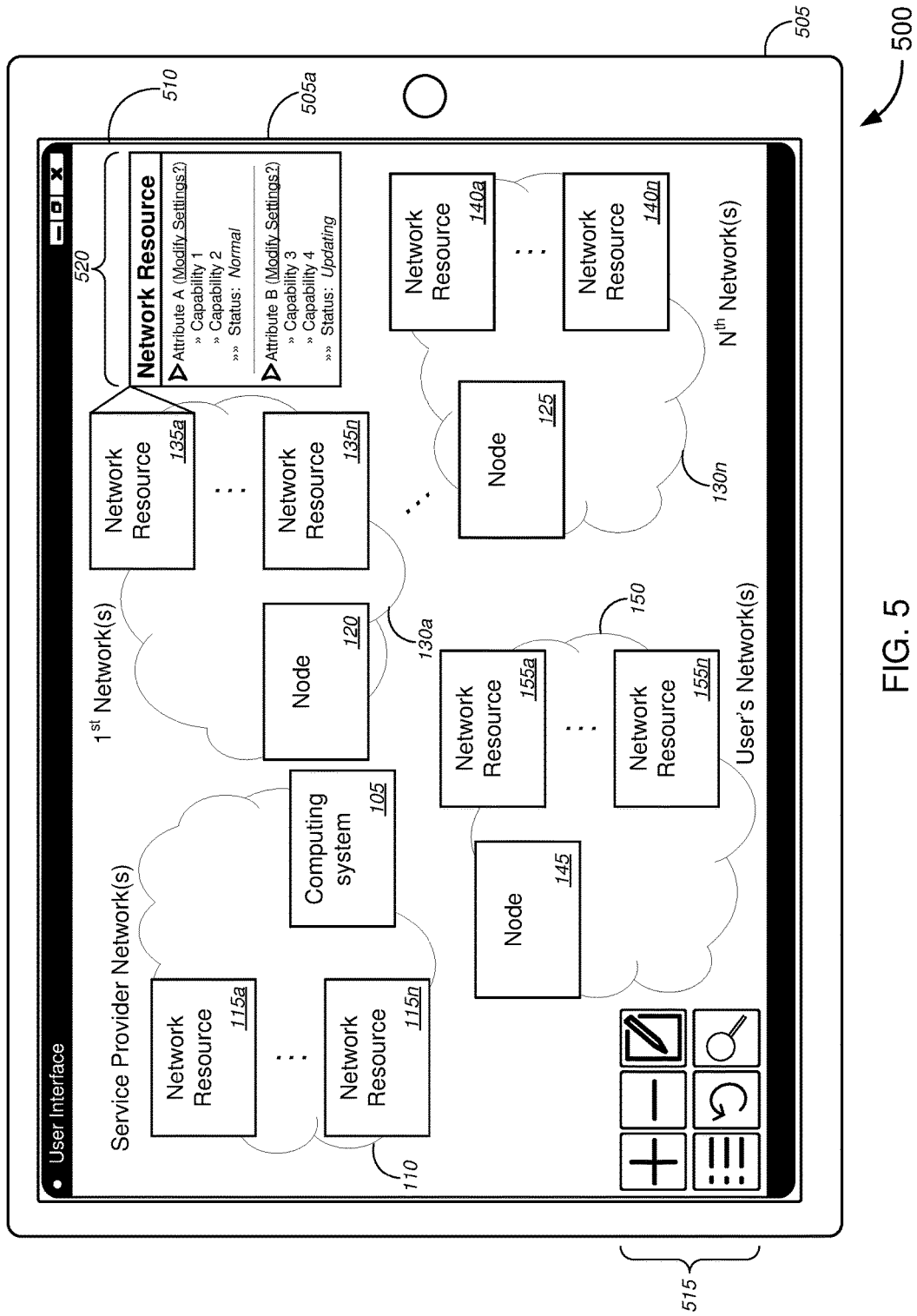
FIG. 5 is an exemplary illustration of a user device used by users that present graphical user interfaces configured for providing options for users to configure settings for implementing model driven service state machine linkage functionality, in accordance with various embodiments.

FIG. 5 is an exemplary illustration of a user device 500 used by users that present graphical user interfaces configured for providing options for users to configure settings for implementing model driven service state machine linkage functionality, in accordance with various embodiments. The embodiment as represented in FIG. 5 is merely illustrative and is not intended to limit the scope of the various embodiments. For example, although the graphical user interface of FIG. 5 depicts a line-by-line or line-to-line type GUI, various embodiments may employ a drag-and-drop type GUI (not shown) that allows for more intuitive graphical interaction between the user and the icons representing user devices, network devices, hardware resources, network resources, networks, attributes, capabilities, states, and/or the like.

In FIG. 5, although a tablet computer is shown as the user device 500, any suitable user device—including, but not limited to, any of user devices 165*a*-165*n* of FIG. 1, which might include, without limitation, at least one of a tablet computer, a smart phone, a mobile phone, a personal digital assistant, a desktop computer, a television, a set-top box, a gaming console, a portable gaming device, and/or the like.

As shown in the embodiment of FIG. 5, user device 500 might comprise a device housing 505 and a display 505*a* (which may be a touchscreen display or a non-touchscreen display). An app, an application window, program window or portal (e.g., web portal or the like) may be displayed on the display 505*a*. In the non-limiting example of FIG. 5, the app or portal 510 running on the user device 500 is a user interface, although the various embodiments are not limited to such an app or portal, as described herein, and can be any suitable app or portal. The app or portal 510 displayed in display 505*a* might provide a user with the ability, functionality, or options to map and modify network resources across multiple (disparate) networks that may be operated or owned by multiple different entities (e.g., in the case of a hybrid cloud system, in which the user's (or company's) private cloud system might be used in conjunction with one or more public cloud systems owned or operated by one or more cloud service providers, or the like).

The app or portal 510 might also display control icons or buttons 515, including buttons (typically, soft buttons or the like) for adding/registering new user devices, new hardware/network resources, new third party servers or nodes, new networks (including third party networks), etc.; for removing/de-registering user devices, hardware/network resources, third party servers or nodes, networks, etc.; for editing or mapping access, configuration, and/or network options for particular or selected user devices, hardware/network resources, third party servers or nodes, networks, and/or the like; for accessing menu options; for undoing changes; for searching for particular user devices, hardware/network resources, third party servers or nodes, networks, etc.; and/or the like.

In the non-limiting embodiment of FIG. 5, selecting or highlighting particular user devices, hardware/network resources, third party servers or nodes, networks, etc. might display a pop-up window or panel that provides access, configuration, or network options for the selected or highlighted particular user devices, hardware/network resources, third party servers or nodes, networks, etc. For example, as shown in the user interface 510 of FIG. 5, the system components of system 100 of FIG. 1 might be displayed, and selecting, for example, network resource 135*a* might result in pop-up window or panel 520 being displayed. In some cases, pop-up window or panel 520 might list for the network resource 135*a* a number of attributes (e.g., attributes A and B in FIG. 5, or the like), capabilities (e.g., capabilities 1 and 2 of attribute A, capabilities 3 and 4 of attribute B, etc. in FIG. 5, or the like), and statuses (e.g., status of normal with respect to attribute A, status of updating with respect to attribute B, etc. in FIG. 5, or the like), and/or the like, some or all of which might be modifiable by selection of such option by the user. Other options, as described in detail above with respect to FIG. 1 and below with respect to FIG. 6E, or the like may also be provided by the user interface 505.

FIGS. 6A-6E (collectively, "FIG. 6") are flow diagrams illustrating a method 600 for implementing model driven service state machine linkage functionality, in accordance with various embodiments. Method 600 in FIG. 6A continues onto FIG. 6B following the circular marker denoted, "A," continues onto FIG. 6C following the circular marker denoted, "B," and continues onto FIG. 6E following the circular marker denoted, "C." Method 600 in FIG. 6B returns to FIG. 6A following the circular marker denoted, "D," Method 600 in FIG. 6C continues onto FIG. 6D following the circular marker denoted, "E," and returns to FIG. 6C following the circular marker denoted, "F."

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems and embodiments 100, 200, 300, and 400 of FIGS. 1, 2, 3, and 4, respectively (or components thereof), such methods may also be implemented using any suitable hardware (or software) implementation. Similarly, while each of the systems and embodiments 100, 200, 300, and 400 of FIGS. 1, 2, 3, and 4, respectively (or components thereof), can operate according to the method 600 illustrated by FIG. 6 (e.g., by executing instructions embodied on a computer readable medium), the systems and embodiments 100, 200, 300, and 400 of FIGS. 1, 2, 3, and 4 can each also operate according to other modes of operation and/or perform other suitable procedures.

Figure 6A:
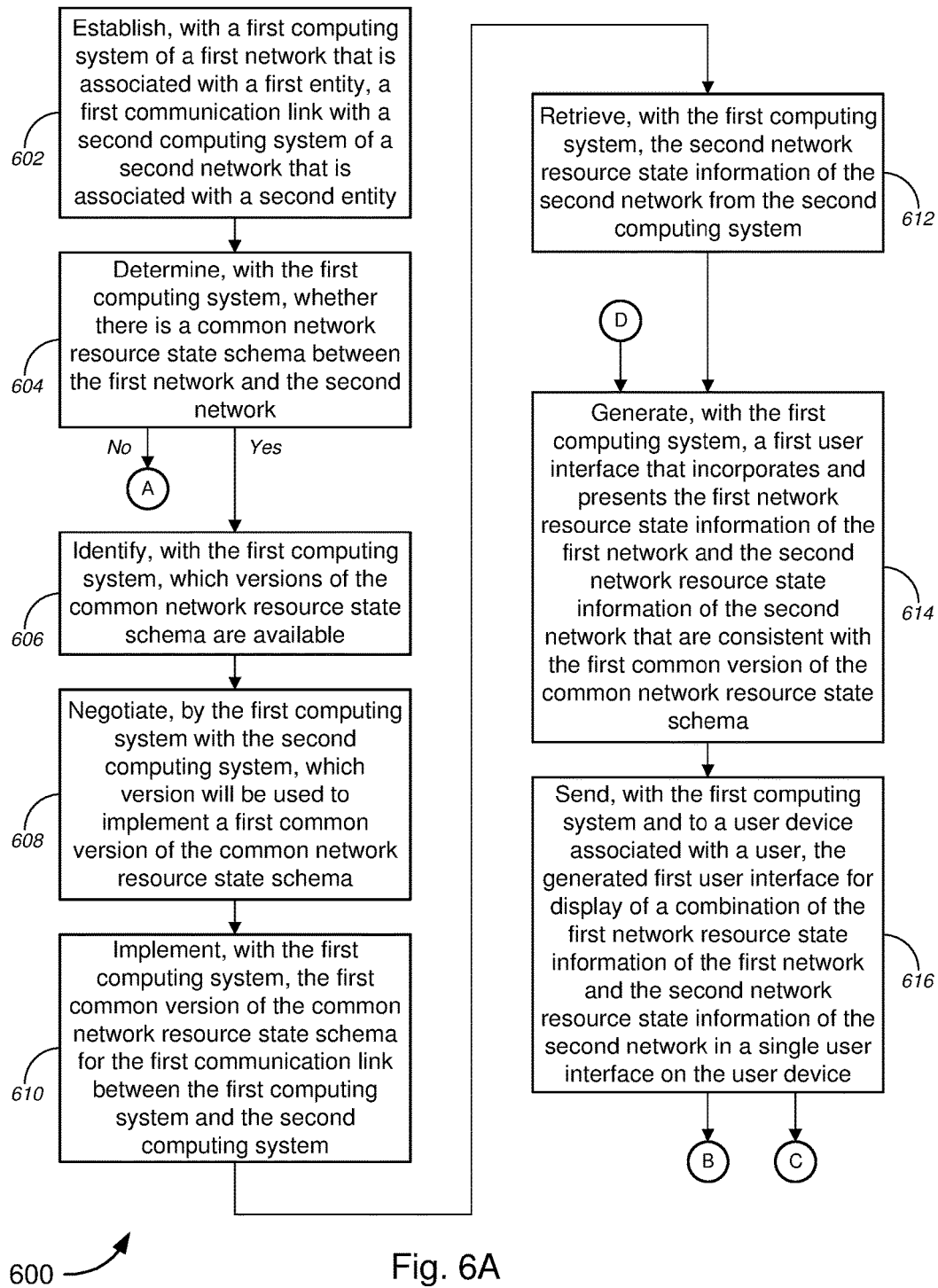

In the non-limiting embodiment of FIG. 6A, method 600, at block 602, might comprise establishing, with a first computing system (which might correspond to computing system 105 of FIGS. 1 and 5, or the like) of a first network (which might correspond to network 110 of FIGS. 1, 2, and 5, or the like) that is associated with a first entity, a first communication link with a second computing system (which might correspond to one of nodes 120, 125, 145, 310, and 310a-310c of FIGS. 1 and 3, or the like) of a second network (which might correspond to one of networks 110 or 130a-130n of FIGS. 1, 2, and 5, or the like) that is associated with a second entity. In some cases, the first communication link might be a real-time interface between the first computing system of the first network and the second computing system of the second network. According to some embodiments, the first entity might be a first network service provider that provides network services to a user, while the second entity might be one of a second service provider separate from the first network service provider, an entity associated with the user, or a second company that is separate from any of the first network service provider and the user, and/or the like. In some cases, the user might be one of an individual, a company, or a government agency, and/or the like.

At block 604, method 600 might comprise determining, with the first computing system, whether there is a common network resource state schema between the first network and the second network. If so, method 600 might continue onto the process at block 606. If not, method 600 might continue onto the process at block 618 in FIG. 6B (following the circular marker denoted, "A"). In some embodiments, the common network resource state schema might be an algorithm-based layered encapsulation ("ABLE") schema— which uses linkages that can be coded and uses a framework that is built via a specific layer linkage approach using global objects of a specific schema for automation, or the like. Alternatively, or additionally, the common network resource state schema might be model-driven service state machine linkage schema (in some cases the ABLE schema might be an example of such a model-driven service state machine linkage schema), or the like.

Based on a determination that there is a common network resource state schema between the first network and the second network, method 600 might further comprise identifying, with the first computing system, which versions of the common network resource state schema are available (block 606), and negotiating, by the first computing system with the second computing system, which version will be used to implement a first common version of the common network resource state schema between the first network and the second network (block 608). At block 610, method 600 might comprise implementing, with the first computing system, the first common version of the common network resource state schema for the first communication link between the first computing system and the second computing system to harmonize network state information between the first network and the second network to generate first network state information of the first network and second network state information of the second network that are consistent with the first common version of the common network resource state schema. In some cases, some versions of the common network resource state schema might be backwards compatible, and thus a common version might be the earlier version between the two versions being used by the two networks. In some instances, the two networks might be using the same version of the common network resource state schema, in which case, the process at block 610 may be skipped as the two networks are already implementing the same or common version of the common network resource state schema. According to some embodiments, the identifying processes at blocks 606 and 608 might be an automated negotiation between the two networks as to a common schema to use in order to effectively communicate meaningful (and, in some senses, universally equivalent or normalized) network state information. As described above, the common schema described herein is not unlike the type of normalized or universally model that is currently used by the airline industry that allows passengers to easily compare and evaluate the different classes of seats (e.g., first class, business class, economy class, etc.) across the multitudes of airlines prior to booking seats on flights.

Method 600 might further comprise, at block 612, retrieving, with the first computing system, the second network state information of the second network from the second computing system. Method 600 might further comprise generating, with the first computing system, a first user interface (which might, in some embodiments, correspond to user interface 510 of FIG. 5, or the like) that incorporates and presents the first network state information of the first network and the second network state information of the second network that are consistent with the first common version of the common network resource state schema (block 614). According to some embodiments, the generated first user interface might include, without limitation, one of a web portal, a software application ("app") interface, and/or the like.

At block 616, method 600 might comprise sending, with the first computing system and to a user device (which might, in some embodiments, correspond to user devices 165a-165n and 500 of FIGS. 1 and 5, or the like) associated with the user, the generated first user interface for display of a combination of the first network state information of the first network and the second network state information of the second network in a single user interface on the user device. In some cases, the user device might include, without limitation, a tablet computer, a laptop computer, a desktop computer, a smart phone, a mobile phone, a personal digital assistant, and/or the like. Method 600 might then proceed to either block 624 in FIG. 6C (following the circular marker denoted "B") or block 646 in FIG. 6E (following the circular marker denoted "C").

Figure 6B:
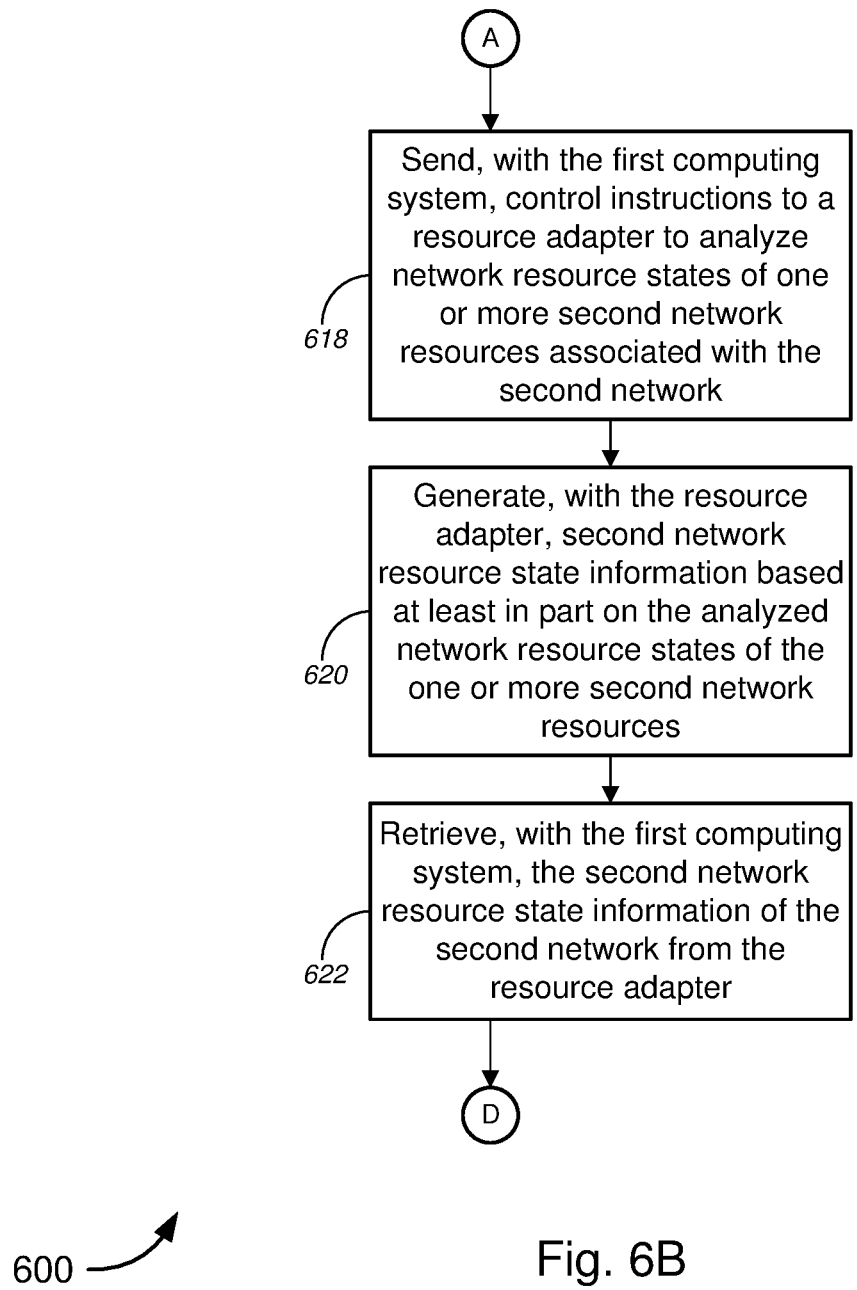

Turning back to block 604, based on a determination that there is no common network resource state schema between the first network and the second network, the process might continue onto block 618 in FIG. 6B (following the circular marker denoted "A"), in which method 600 might comprise sending, with the first computing system, control instructions to a resource adapter (which might correspond to resource adapter 160 of FIG. 1, or the like) to analyze network states of one or more second network resources associated with the second network (block 618) and to generate second network state information based at least in part on the analyzed network states of the one or more second network resources (block 620). In this case, the first network state information and the second network state information might be consistent with the first common version of the common network resource state schema. Method 600, at block 622, might comprise retrieving, with the first computing system, the second network state information of the second network from the resource adapter. Method 600 might then return to the process at block 614 following the circular marker denoted, "D."

Figure 6C:
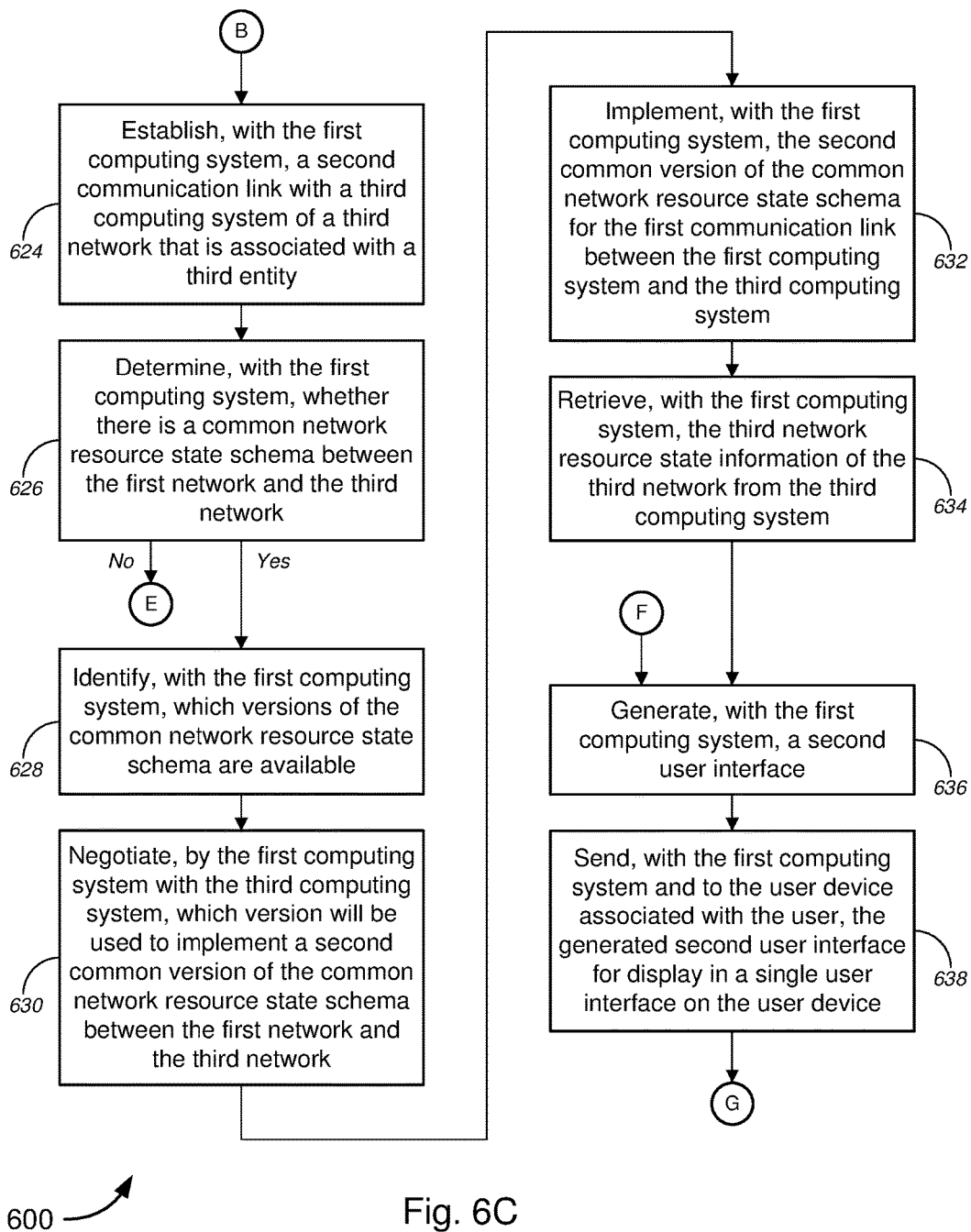

With reference to FIG. 6C, following the circular marker denoted "B," method 600, at block 624, might comprise establishing, with the first computing system, a second communication link with a third computing system (which might correspond to another one of nodes 120, 125, 145, 310, and 310a-310c of FIGS. 1 and 3, or the like) of a third network (which might correspond to another one of networks 110 or 130a-130n of FIGS. 1, 2, and 5, or the like) that is associated with a third entity. In some cases, the second communication link might be a real-time interface between the first computing system of the first network and the third computing system of the third network. According to some embodiments, the first entity might be a first network service provider that provides network services to the user, while the second entity might be one of a second service provider separate from the first network service provider, an entity associated with the user, or a second company that is separate from any of the first network service provider and the user, and/or the like, and the third entity might be one of a third service provider separate from the first network service provider, an entity associated with the user, or a third company that is separate from any of the first network service provider and the user, and/or the like.

At block 626, method 600 might comprise determining, with the first computing system, whether there is a common network resource state schema between the first network and the third network. If so, method 600 might continue onto the process at block 628. If not, method 600 might continue onto the process at block 640 in FIG. 6D (following the circular marker denoted, "E"). As described above, in some embodiments, the common network resource state schema might be an algorithm-based layered encapsulation ("ABLE") schema—which uses linkages that can be coded and uses a framework that is built via a specific layer linkage approach using global objects of a specific schema for automation, or the like. Alternatively, or additionally, the common network resource state schema might be model-driven service state machine linkage schema (in some cases the ABLE schema might be an example of such a model-driven service state machine linkage schema), or the like.

Based on a determination that there is a common network resource state schema between the first network and the third network, method 600 might further comprise identifying, with the first computing system, which versions of the common network resource state schema are available (block 628), and negotiating, by the first computing system with the third computing system, which version will be used to implement a second common version of the common network resource state schema between the first network and the third network (block 630). At block 632, method 600 might comprise implementing, with the first computing system, the second common version of the common network resource state schema for the first communication link between the first computing system and the third computing system to harmonize network state information between the first network and the third network to generate first network state information of the first network and third network state information of the third network that are consistent with the second common version of the common network resource state schema. In some cases, some versions of the common network resource state schema might be backwards compatible, and thus a common version might be the earlier version between the two versions being used by the two networks. In some instances, the two networks might be using the same version of the common network resource state schema, in which case, the process at block 632 may be skipped as the two networks are already implementing the same or common version of the common network resource state schema. According to some embodiments, the identifying processes at blocks 628 and 630 might be an automated negotiation between the two networks as to a common schema to use in order to effectively communicate meaningful (and, in some senses, universally equivalent or normalized) network state information.

Method 600 might further comprise, at block 634, retrieving, with the first computing system, the third network state information of the third network from the third computing system. Method 600 might further comprise generating, with the first computing system, a second user interface (which might, in some embodiments, correspond to user interface 510 of FIG. 5, or the like) (block 636). According to some embodiments, the generated second user interface might include, without limitation, one of a web portal, a software application ("app") interface, and/or the like. At block 638, method 600 might comprise sending, with the first computing system and to the user device associated with the user, the generated second user interface for display in a single user interface on the user device. As described above, in some cases, the user device might include, without limitation, a tablet computer, a laptop computer, a desktop computer, a smart phone, a mobile phone, a personal digital assistant, and/or the like.

In the case that the first common version and the second common version of the common network resource state schema are different versions, generating the second user interface (at block 636) might comprise generating, with the first computing system, a second user interface that incorporates and presents the first network state information of the first network and the third network state information of the third network that are consistent with the second common version of the common network resource state schema. Likewise, sending, with the first computing system and to the user device associated with the user, the generated second user interface for display (at block 638) might comprise sending, with the first computing system and to the user device associated with the user, the generated second user interface for display of a combination of the first network state information of the first network and the third network state information of the third network in a single user interface on the user device.

Alternatively, if the first common version and the second common version of the common network resource state schema are the same version, generating the second user interface (at block 636) might comprise generating, with the first computing system, the second user interface that incorporates and presents the first network state information of the first network, the second network state information of the second network, and the third network state information of the third network that are consistent with the second common version (or first common version, which, in this case, is the same version) of the common network resource state schema. Similarly, sending, with the first computing system and to the user device associated with the user, the generated second user interface for display (at block 638) might comprise sending, with the first computing system and to the user device associated with the user, the generated second user interface for display of a combination of the first network state information of the first network, the second network state information of the second network, and the third network state information of the third network in a single user interface on the user device. Method 600 might then proceed to either block 646 in FIG. 6E (following the circular marker denoted "G")

Turning back to block 626, based on a determination that there is no common network resource state schema between the first network and the third network, the process might continue onto block 640 in FIG. 6D (following the circular marker denoted "E"), in which method 600 might comprise sending, with the first computing system, control instructions to the resource adapter to analyze network states of one or more third network resources associated with the third network (block 640) and to generate third network state information based at least in part on the analyzed network states of the one or more third network resources (block 642). In this case, the first network state information and the third network state information might be consistent with the second common version of the common network resource state schema. Method 600, at block 644, might comprise retrieving, with the first computing system, the third network state information of the third network from the resource adapter. Method 600 might then return to the process at block 636 following the circular marker denoted, "F."

Figure 6E:
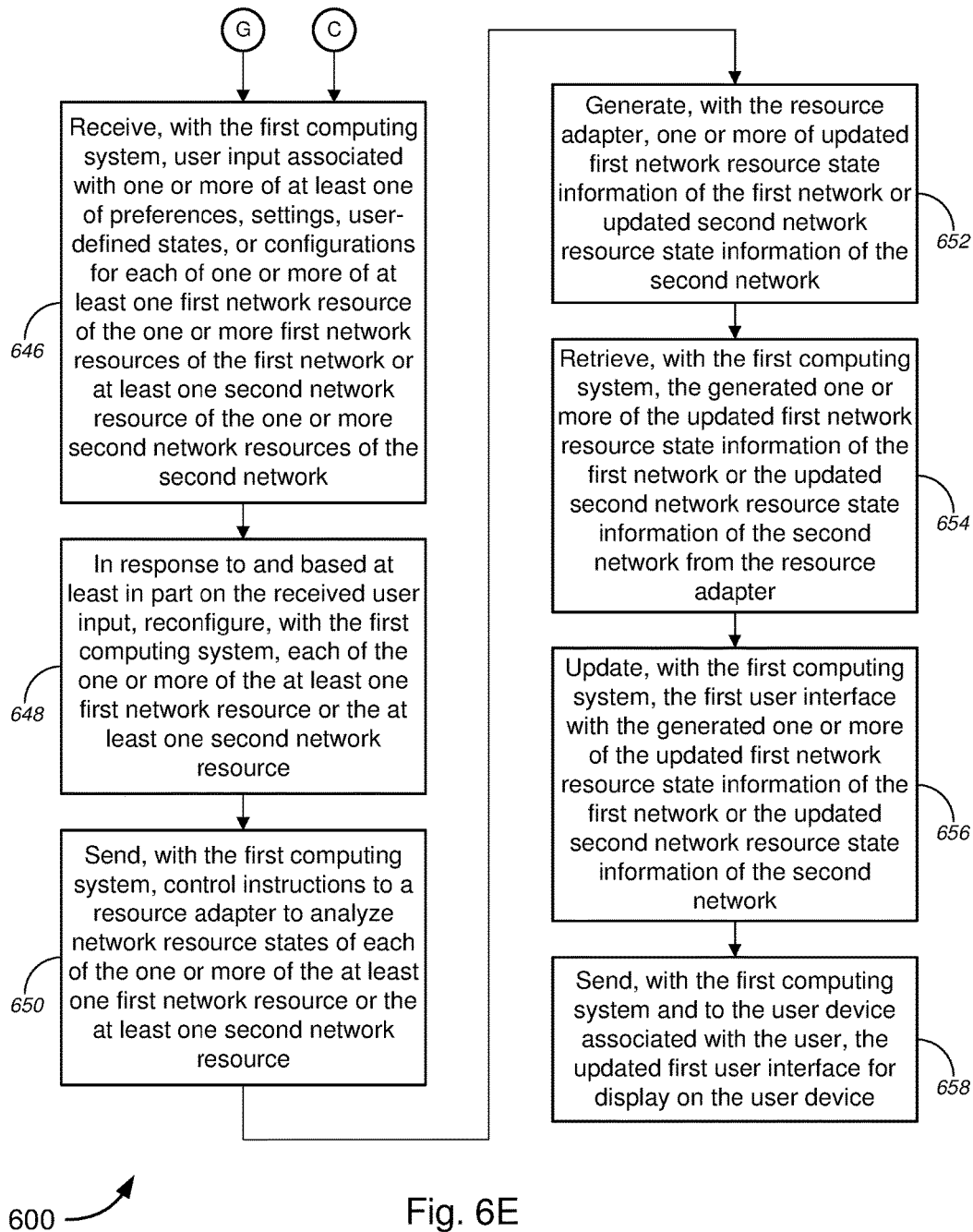

In some embodiments, the first network state information might comprise at least one of one or more first attributes, one or more first capabilities, or one or more first states, and/or the like of each of one or more first network resources of the first network, while the second network state information might comprise at least one of one or more second attributes, one or more second capabilities, or one or more second states, and/or the like of each of one or more second network resources of the second network, and while the third network state information might comprise at least one of one or more third attributes, one or more third capabilities, or one or more third states, and/or the like of each of one or more third network resources of the third network. In some cases, the generated first user interface (at block 614) and the generated second user interface (at block 636) might each include, but are not limited to, user options for selecting and modifying at least one of preferences, settings, user-defined states, or configurations, and/or the like for each of the one or more first network resources of the first network and for each of the one or more second network resources of the second network (and, in some cases, for each of the one or more third network resources of the third network, as well). With reference to FIG. 6E, following the circular marker denoted "C" or the circular marker denoted "G," method 600, at block 646, might comprise receiving, with the first computing system, user input associated with one or more of the at least one of preferences, settings, user-defined states, or configurations for each of one or more of at least one first network resource of the one or more first network resources of the first network or at least one second network resource of the one or more second network resources of the second network (and, in some cases, at least one third network resource of the one or more third network resources of the third network, as well). At block 648, method 600 might comprise, in response to and based at least in part on the received user input, reconfiguring, with the first computing system, each of the one or more of the at least one first network resource or the at least one second network resource (and, in some cases, the at least one third network resource, as well).

Method 600 might further comprise sending, with the first computing system, control instructions to the resource adapter to analyze network states of each of the one or more of the at least one first network resource or the at least one second network resource (and, in some cases, the at least one third network resource, as well) (block 650), and to generate one or more of updated first network state information of the first network or updated second network state information of the second network (and, in some cases, updated third network state information of the third network, as well), based at least in part on the analyzed network states of each of the one or more of the at least one first network resource or the at least one second network resource (and, in some cases, the at least one third network resource, as well) (block 652).

At block 654, method 600 might comprise retrieving, with the first computing system, the generated one or more of the updated first network state information of the first network or the updated second network state information of the second network from the resource adapter (and, in some cases, the updated third network state information of the third network, as well). Method 600 might further comprise, at block 656, updating, with the first computing system, the first user interface with the generated one or more of the updated first network state information of the first network or the updated second network state information of the second network, or updating, with the first computing system, the second user interface with the generated one or more of the updated first network state information of the first network, the updated second network state information of the second network, or the updated third network state information of the third network. Method 600, at block 658, might comprise sending, with the first computing system and to the user device associated with the user, the updated first user interface (or the updated second user interface) for display on the user device.

Exemplary System and Hardware Implementation

Figure 7:
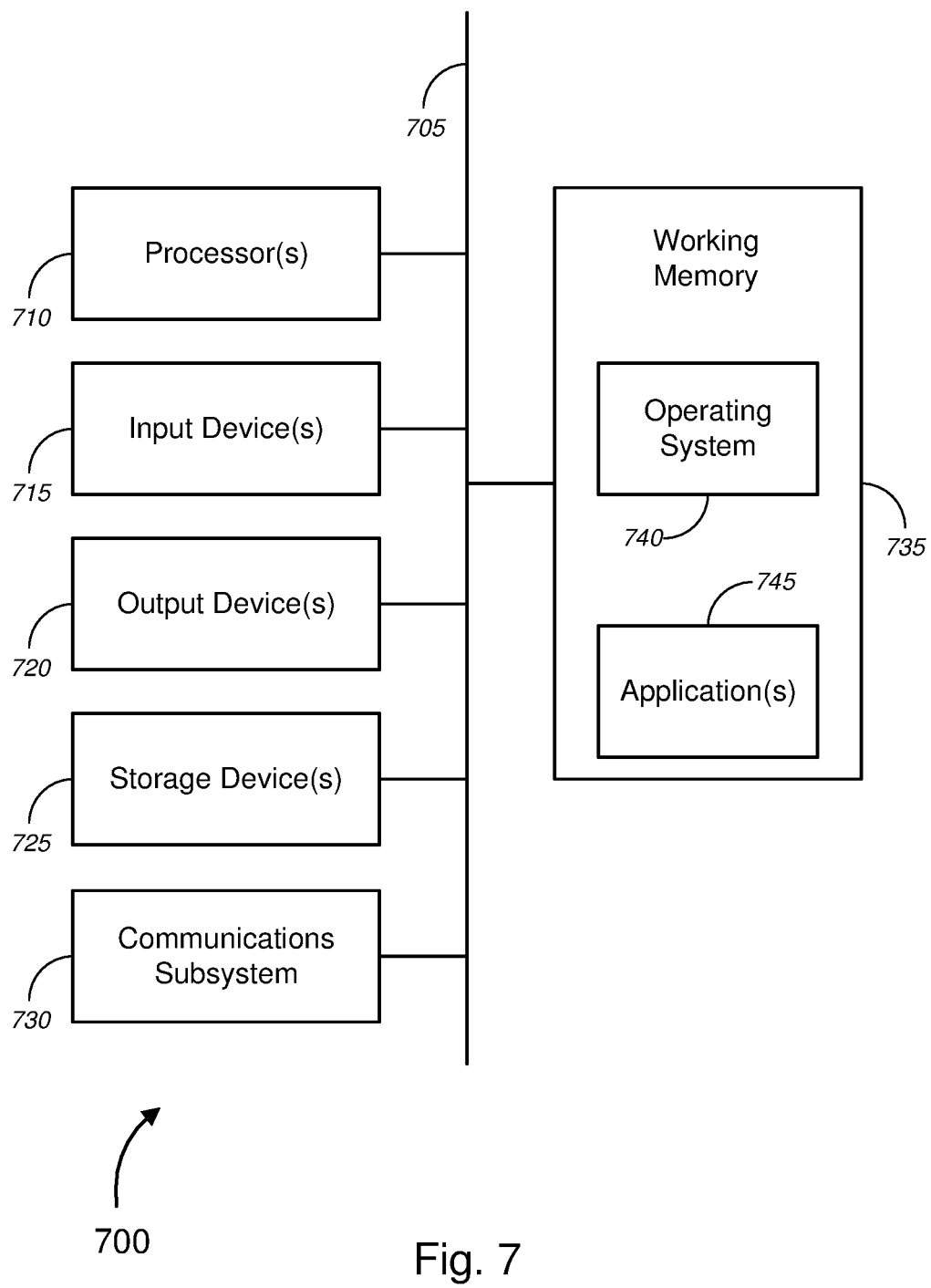
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., computing system 105, nodes 120, 125, 145, 310, and 310a-310c, resource adapter 160, user devices 165a-165n and 500, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., computing system 105, nodes 120, 125, 145, 310, and 310a-310c, resource adapter 160, user devices 165a-165n and 500, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, a Z-Wave device, a ZigBee device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like.

Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
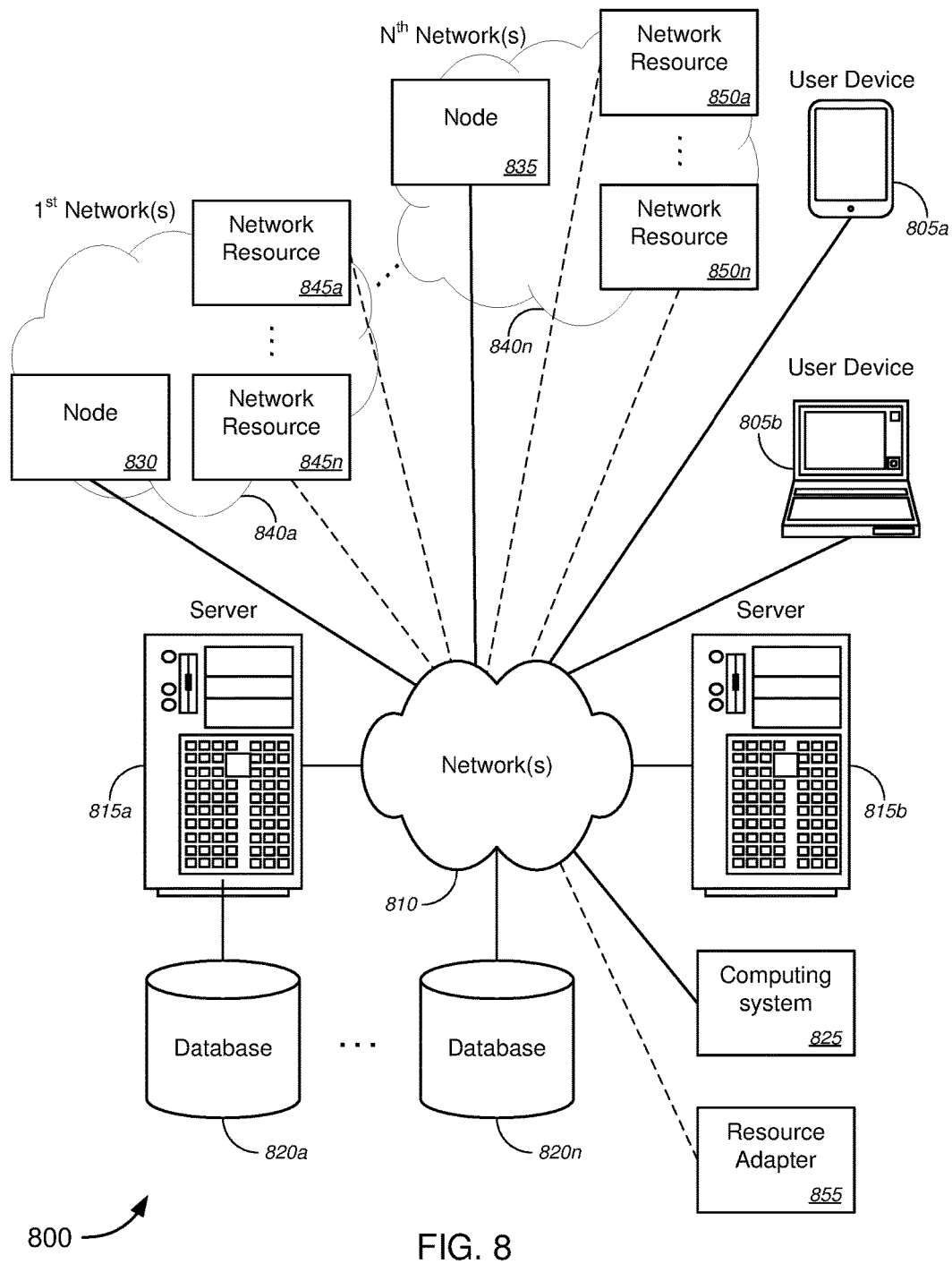
FIG. 8 is a block diagram illustrating an example of a networked system of computers, computing systems, or system hardware architecture, which can be used in accordance with various embodiments.

As noted above, a set of embodiments comprises methods and systems for implementing communications amongst different machines and/or networks, and, in particular embodiments, to methods, systems, apparatus, and computer software for implementing model driven service state machine linkage functionality. FIG. 8 illustrates a schematic diagram of a system 800 that can be used in accordance with various embodiments. The system 800 can each include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 810 (similar to networks 135 of FIGS. 1 and 2, or the like), as well as the self-organizing network 850 (similar to networks 110, 130*a*-130*n*, and 150 of FIGS. 1, 2, and 5, or the like), can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing communications amongst different machines and/or networks, and, in particular embodiments, to methods, systems, apparatus, and computer software for implementing model driven service state machine linkage functionality, or the like, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (and/or a user computer, user device, or customer device 805). Alternatively, a database 820n can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

With reference to FIG. 8, according to some embodiments, system 800 might further comprise a computing system 825 (similar to computing system 105 of FIGS. 1 and 5, or the like), a node 830 (similar to node 120, 145, 310, and 310a-310c of FIGS. 1 and 3, or the like), a node 835 (similar to node 125, 145, 310, and 310a-310c of FIGS. 1 and 3, or the like), a first through $N^{th}$ network(s) 840a-840n (that are separate from each other and separate from network 810; similar to network(s) 130a-130n of FIGS. 1 and 5, or the like), one or more network resources 845a-845n (similar to network resources 135a-135n of FIGS. 1 and 5, or the like), and one or more network resources 850a-850n (similar to network resources 140a-140n of FIGS. 1 and 5, or the like), and a resource adapter 855 (similar to resource adapter 160 of FIG. 1, or the like). The computing system 825 might be associated with network 810, while the node 830 might be associated with first network 840a, and the node 835 might be associated with $N^{th}$ network 840n. The one or more resources 845a-845n might be associated with first network 840a, while the one or more resources 850a-850n might be associated with $N^{th}$ network 840n. The resource adapter 855 might access one or more of the first through $N^{th}$ networks 840a-840n (as depicted in FIG. 8 by dashed lines connecting the resource adapter 855 to each of network resources 845a, 845n, 850a, and 850n via network(s) 810) in order to analyze network states of each of one or more of at least one first network resource of the first network through at least one $N^{th}$ network resource of the $N^{th}$ network, and to generate one or more of updated first network state information of the first network through updated $N^{th}$ network state information of the $N^{th}$ network based at least in part on the analyzed network states of each of the one or more of the at least one first network resource through the at least one $N^{th}$ network resource.

In operation, the computing system 825 of network 810 (which might be associated with a first entity) might establish a first communication link with node 830 of network 840a (which might be associated with a second entity). The computing system 825 might determine whether there is a common network resource state schema between the network 810 and the network 840a. If so, the computing system 825 might identify which versions of the common network resource state schema are available, and negotiating, by the computing system 825 with the node 830, which version will be used to implement a first common version of the common network resource state schema between the network 810 and the network 840a. The computing system 825 might implement the first common version of the common network resource state schema for the first communication link between the computing system 825 and the node 830 to harmonize network state information between the network 810 and the network 840a to generate first network state information of the network 810 and second network state information of the network 840a that are consistent with the first common version of the common network resource state schema. The computing system 825 might retrieve the second network state information of the network 840a from the node 830. The computing system 825 might generate a first user interface that incorporates and presents the first network state information of the network 810 and the second network state information of the network 840a that are consistent with the first common version of the common network resource state schema. The computing system 825 might send, to a user device 805a or 805b (similar to user devices 165a-165n and 500 of FIGS. 1 and 5, or the like) associated with a user, the generated first user interface for display of a combination of the first network state information of the network 810 and the second network state information of the network 840a in a single user interface on the user device 805.

These and other functions of the system 800 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    establishing, with a first computing system of a first network, a first communication link with a second computing system of a second network;
    determining, with the first computing system, whether there is a common network resource state schema between the first network and the second network;
    based on a determination that there is a common network resource state schema between the first network and the second network, identifying, with the first computing system, which versions of the common network resource state schema are available, and negotiating, by the first computing system with the second computing system, which version will be used to implement a first common version of the common network resource state schema between the first network and the second network; and
    implementing, with the first computing system, the first common version of the common network resource state schema for the first communication link between the first computing system and the second computing system to harmonize network state information between the first network and the second network to generate first network state information of the first network and second network state information of the second network that are consistent with the first common version of the common network resource state schema.

2. The method of claim 1, wherein the method further comprises:
    generating, with the first computing system, a first user interface that incorporates and presents the first network state information of the first network and the second network state information of the second network that are consistent with the first common version of the common network resource state schema, wherein the generated first user interface comprises one of a web portal or a software application ("app") interface.

3. The method of claim 2, wherein the first network state information comprises at least one of one or more first attributes, one or more first capabilities, or one or more first states of each of one or more first network resources of the first network, wherein the second network state information comprises at least one of one or more second attributes, one or more second capabilities, or one or more second states of each of one or more second network resources of the second network.

4. The method of claim 3, wherein the generated first user interface comprises user options for selecting and modifying at least one of preferences, settings, user-defined states, or configurations for each of the one or more first network resources of the first network and for each of the one or more second network resources of the second network.

5. The method of claim 4, further comprising:
    receiving, with the first computing system, user input associated with one or more of the at least one of preferences, settings, user-defined states, or configurations for each of one or more of at least one first network resource of the one or more first network resources of the first network or at least one second network resource of the one or more second network resources of the second network;
    in response to and based at least in part on the received user input, reconfiguring, with the first computing system, each of the one or more of the at least one first network resource or the at least one second network resource;
    sending, with the first computing system, control instructions to a resource adapter to analyze network states of each of the one or more of the at least one first network resource or the at least one second network resource, and to generate one or more of updated first network state information of the first network or updated second network state information of the second network based at least in part on the analyzed network states of each of the one or more of the at least one first network resource or the at least one second network resource;
    retrieving, with the first computing system, the generated one or more of the updated first network state information of the first network or the updated second network state information of the second network from the resource adapter;
    updating, with the first computing system, the first user interface with the generated one or more of the updated first network state information of the first network or the updated second network state information of the second network; and sending, with the first computing system and to a user device associated with the user, the updated first user interface for display on the user device.

6. The method of claim 1, wherein the first communication link is a real-time interface between the first computing system of the first network and the second computing system of the second network.

7. The method of claim 1, wherein the user is one of an individual, a company, or a government agency.

8. The method of claim 1, wherein the first computing system of the first network is associated with a first entity and the second computing system of the second network is associated with a second entity, wherein the first entity is a first network service provider that provides network services to the user, wherein the second entity is one of a second service provider separate from the first network service provider, an entity associated with the user, or a second company that is separate from any of the first network service provider and the user.

9. The method of claim 1, further comprising:
establishing, with the first computing system, a second communication link with a third computing system of a third network;
determining, with the first computing system, whether there is a common network resource state schema between the first network and the third network;
based on a determination that there is a common network resource state schema between the first network and the third network, identifying, with the first computing system, which versions of the common network resource state schema are available, and negotiating, by the first computing system with the third computing system, which version will be used to implement a second common version of the common network resource state schema between the first network and the third network;
implementing, with the first computing system, the second common version of the common network resource state schema for the first communication link between the first computing system and the third computing system to harmonize network state information between the first network and the third network to generate first network state information of the first network and third network state information of the third network that are consistent with the second common version of the common network resource state schema;
retrieving, with the first computing system, the third network state information of the third network from the third computing system;
generating, with the first computing system, a second user interface that incorporates and presents the first network state information of the first network and the third network state information of the third network that are consistent with the second common version of the common network resource state schema; and
sending, with the first computing system and to the user device associated with the user, the generated second user interface for display of a combination of the first network state information of the first network and the third network state information of the third network in a single user interface on the user device.

10. The method of claim 9, wherein the first computing system of the first network is associated with a first entity, the second computing system of the second network is associated with a second entity, and the third computing system of the third network is associated with a third entity, the first entity is a first network service provider that provides network services to the user, wherein the second entity is one of a second service provider separate from the first network service provider, an entity associated with the user, or a second company that is separate from both the first network service provider and the user, wherein the third entity is one of a third service provider separate from the first network service provider, an entity associated with the user, or a third company that is separate from any of the first network service provider and the user.

11. The method of claim 9, wherein the first common version of the common network resource state schema and the second common version of the common network resource state schema are the same common version of the common network resource state schema, wherein generating the second user interface comprises generating, with the first computing system, the second user interface that incorporates and presents the first network state information of the first network, the second network state information of the second network, and the third network state information of the third network that are consistent with the second common version of the common network resource state schema, and wherein sending the generated second user interface comprises sending, with the first computing system and to the user device associated with the user, the generated second user interface for display of a combination of the first network state information of the first network, the second network state information of the second network, and the third network state information of the third network in a single user interface on the user device.

12. The method of claim 1, further comprising:
establishing, with the first computing system, a third communication link with a fourth computing system of a fourth network;
determining, with the first computing system, whether there is a common network resource state schema between the first network and the fourth network;
based on a determination that there is no common network resource state schema between the first network and the fourth network, sending, with the first computing system, control instructions to a resource adapter to analyze network states of one or more fourth network resources associated with the fourth network and to generate fourth network state information based at least in part on the analyzed network states of the one or more fourth network resources, the first network state information and the fourth network state information being consistent with a third common version of the common network resource state schema;
retrieving, with the first computing system, the fourth network state information of the fourth network from the resource adapter;
generating, with the first computing system, a third user interface that incorporates and presents the first network state information of the first network and the fourth network state information of the fourth network that are consistent with the third common version of the common network resource state schema; and
sending, with the first computing system and to the user device associated with the user, the generated third user interface for display of a combination of the first network state information of the first network and the fourth network state information of the fourth network in a single user interface on the user device.

13. The method of claim 12, wherein the fourth network utilizes a legacy network state schema that is different from the common network resource state schema.

14. The method of claim 12, wherein the first common version of the common network resource state schema and the third common version of the common network resource state schema are the same common version of the common network resource state schema, wherein generating the third user interface comprises generating, with the first computing system, the third user interface that incorporates and presents the first network state information of the first network, the second network state information of the second network, and the fourth network state information of the fourth network that are consistent with the third common version of the common network resource state schema, and wherein sending the generated second user interface comprises sending, with the first computing system and to the user device associated with the user, the generated third user interface for display of a combination of the first network state information of the first network, the second network state information of the second network, and the fourth network state information of the fourth network in a single user interface on the user device.

15. An apparatus of a first network, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
establish a first communication link with a second computing system of a second network;
determine whether there is a common network resource state schema between the first network and the second network;
based on a determination that there is a common network resource state schema between the first network and the second network, identify which versions of the common network resource state schema are available, and negotiating, by the first computing system with the second computing system, which version will be used to implement a first common version of the common network resource state schema between the first network and the second network; and
implement the first common version of the common network resource state schema for the first communication link between the apparatus and the second computing system to harmonize network state information between the first network and the second network to generate first network state information of the first network and second network state information of the second network that are consistent with the first common version of the common network resource state schema.

16. The apparatus of claim 15, wherein the set of instructions, when executed by the at least one processor, further causes the apparatus to:
generate a first user interface that incorporates and presents the first network state information of the first network and the second network state information of the second network that are consistent with the first common version of the common network resource state schema.

17. The apparatus of claim 16, wherein the first network state information comprises at least one of one or more first attributes, one or more first capabilities, or one or more first states of each of one or more first network resources of the first network, wherein the second network state information comprises at least one of one or more second attributes, one or more second capabilities, or one or more second states of each of one or more second network resources of the second network.

18. The apparatus of claim 17, wherein the generated first user interface comprises user options for selecting and modifying at least one of preferences, settings, user-defined states, or configurations for each of the one or more first network resources of the first network and for each of the one or more second network resources of the second network.

19. The apparatus of claim 18, wherein the set of instructions, when executed by the at least one processor, further causes the apparatus to:
receive user input associated with one or more of the at least one of preferences, settings, user-defined states, or configurations for each of one or more of at least one first network resource of the one or more first network resources of the first network or at least one second network resource of the one or more second network resources of the second network;
in response to and based at least in part on the received user input, reconfigure each of the one or more of the at least one first network resource or the at least one second network resource;
send control instructions to a resource adapter to analyze network states of each of the one or more of the at least one first network resource or the at least one second network resource, and to generate one or more of updated first network state information of the first network or updated second network state information of the second network based at least in part on the analyzed network states of each of the one or more of the at least one first network resource or the at least one second network resource;
retrieve the generated one or more of the updated first network state information of the first network or the updated second network state information of the second network from the resource adapter;
update the first user interface with the generated one or more of the updated first network state information of the first network or the updated second network state information of the second network; and
send, to a user device associated with the user, the updated first user interface for display on the user device.

20. The apparatus of claim 15, wherein the set of instructions, when executed by the at least one processor, further causes the apparatus to:
establish a second communication link with a third computing system of a third network;
determine whether there is a common network resource state schema between the first network and the third network;
based on a determination that there is a common network resource state schema between the first network and the third network, identify which versions of the common network resource state schema are available, and negotiating, by the first computing system with the third computing system, which version will be used to implement a second common version of the common network resource state schema between the first network and the third network;
implement the second common version of the common network resource state schema for the first communication link between the first computing system and the third computing system to harmonize network state information between the first network and the third network to generate first network state information of the first network and third network state information of the third network that are consistent with the second common version of the common network resource state schema.

* * * * *